US008082523B2

(12) United States Patent
Forstall et al.

(10) Patent No.: US 8,082,523 B2
(45) Date of Patent: Dec. 20, 2011

(54) PORTABLE ELECTRONIC DEVICE WITH GRAPHICAL USER INTERFACE SUPPORTING APPLICATION SWITCHING

(75) Inventors: Scott Forstall, Mountain View, CA (US); Greg Christie, San Jose, CA (US); Stephen O. Lemay, San Francisco, CA (US); Marcel Van Os, San Francisco, CA (US); Imran Chaudhri, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 769 days.

(21) Appl. No.: 11/969,908

(22) Filed: Jan. 6, 2008

(65) Prior Publication Data

US 2008/0168379 A1    Jul. 10, 2008

Related U.S. Application Data

(60) Provisional application No. 60/937,993, filed on Jun. 29, 2007, provisional application No. 60/879,469, filed on Jan. 8, 2007, provisional application No. 60/883,809, filed on Jan. 7, 2007, provisional application No. 60/879,253, filed on Jan. 7, 2007.

(51) Int. Cl.
*G06F 3/033* (2006.01)
(52) U.S. Cl. ........ 715/863; 715/778; 715/788; 715/805; 715/864
(58) Field of Classification Search .................. 715/778, 715/863
See application file for complete search history.

(56) References Cited

U.S. PATENT DOCUMENTS

| | | | | |
|---|---|---|---|---|
| 6,047,054 | A | 4/2000 | Bayless et al. | 379/202 |
| 6,304,261 | B1 | 10/2001 | Shields et al. | 345/358 |
| 6,389,301 | B1 | 5/2002 | Furuya | 455/566 |
| 6,512,449 | B1 | 1/2003 | Aizawa | 340/7.55 |
| 6,727,917 | B1 | 4/2004 | Chew et al. | 345/765 |
| 6,751,446 | B1 * | 6/2004 | Kim et al. | 455/90.1 |

(Continued)

FOREIGN PATENT DOCUMENTS

JP        9 152955 A    6/1997
(Continued)

OTHER PUBLICATIONS

Using Your Palm Treo 700w Smartphone, 2005-2006, p. 30, 31, 48, 49, 52, 130, 253, 254.*

(Continued)

*Primary Examiner* — Boris Pesin
*Assistant Examiner* — Matthew Ell
(74) *Attorney, Agent, or Firm* — Morgan, Lewis & Bockius LLP

(57) ABSTRACT

A portable electronic device displays, on a touch screen display, a user interface for a phone application during a phone call. In response to detecting activation of a menu icon or menu button, the UI for the phone application is replaced with a menu of application icons, while maintaining the phone call. In response to detecting a finger gesture on a non-telephone service application icon, displaying a user interface for the non-telephone service application while continuing to maintain the phone call, the UI for the non-telephone service application including a switch application icon that is not displayed in the UI when there is no ongoing phone call. In response to detecting a finger gesture on the switch application icon, replacing display of the UI for the non-telephone service application with a respective UI for the phone application while continuing to maintain the phone call.

21 Claims, 16 Drawing Sheets

U.S. PATENT DOCUMENTS

| | | | |
|---|---|---|---|
| 7,050,835 B2 | 5/2006 | Hack et al. | 455/566 |
| 7,123,945 B2 | 10/2006 | Kokubo | 455/566 |
| 7,218,312 B2 | 5/2007 | Takaku | 345/158 |
| 7,222,304 B2 | 5/2007 | Beaton et al. | 715/744 |
| 7,225,409 B1 | 5/2007 | Schnarel et al. | 715/747 |
| 7,346,855 B2 | 3/2008 | Hellyar et al. | 715/783 |
| 2002/0173299 A1 | 11/2002 | Buchholz et al. | 455/418 |
| 2003/0013483 A1 | 1/2003 | Ausems et al. | 455/556 |
| 2004/0056837 A1 | 3/2004 | Koga et al. | 345/156 |
| 2004/0242266 A1 | 12/2004 | Tagliabue et al. | 455/556.1 |
| 2005/0164688 A1 | 7/2005 | Satake | 455/418 |
| 2005/0287995 A1 | 12/2005 | Yoon | 455/414.1 |
| 2006/0015819 A1 | 1/2006 | Hawkins et al. | 715/780 |
| 2006/0030368 A1 | 2/2006 | Soelberg | 455/566 |
| 2006/0030369 A1 | 2/2006 | Yang | 455/566 |
| 2006/0058063 A1 | 3/2006 | Bocking et al. | 455/556.2 |
| 2006/0107227 A1 | 5/2006 | Kiljander | 715/772 |
| 2006/0171675 A1 | 8/2006 | Kolletzki | 386/95 |
| 2006/0181519 A1 | 8/2006 | Vernier et al. | 345/173 |
| 2006/0211454 A1 | 9/2006 | Park et al. | 455/566 |
| 2006/0288107 A1 | 12/2006 | Klassen et al. | 709/227 |
| 2007/0004451 A1 | 1/2007 | Anderson | 455/556.1 |
| 2007/0041582 A1 | 2/2007 | Lam | 379/908 |
| 2007/0045961 A1 | 3/2007 | Morris | 273/292 |
| 2007/0080954 A1 | 4/2007 | Griffin et al. | 345/173 |
| 2007/0085759 A1 | 4/2007 | Lee et al. | 345/1.1 |
| 2007/0120832 A1 | 5/2007 | Saarinen et al. | 345/173 |
| 2008/0163082 A1* | 7/2008 | Rytivaara | 715/762 |
| 2008/0168401 A1* | 7/2008 | Boule et al. | 715/863 |

FOREIGN PATENT DOCUMENTS

| | | |
|---|---|---|
| WO | WO 95/25397 A2 | 9/1995 |

OTHER PUBLICATIONS

P900 User Guide, 2003, p. 20.*

Pocket PC Phone User Manual, Audiovox PPC 5050 "To Answer or Reject a Call," pp. 1, 48-50, printed Apr. 11, 2008.

Sony Ericsson Mobile Communications AB: "P900 User Guide" XP002479719, [Online] http://www.sonyericcson.com/downloads/P900_UG_R1b_EN.pdf, Sep. 2003, pp. 8, 16, 17, 20, 24-26, 42-45, 137, (98 total pages).

International Search Report and Written Opinion for International Application PCT/US2008/050420, mailed Jun. 2, 2008.

Athale et al., "One GUI: Method and System for User Interface Synthesis," Motorola, Inc., May 23, 2006, 11 pages.

Foster et al., "Dual Mode Radio," Motorola Technical Developments, Motorola, Inc., Jun. 1999.

Macedonia, M., "iPhones Target the Tech Elite," Entertainment Computing, Jun. 2007, pp. 94-95.

Tidwell, J., "Global Navigation," from Designing Interfaces, Copyright © 2006 O'Reilly Media, Inc., pp. 66-67.

Office Action dated Dec. 4, 2009, received in European Patent Application No. 08 727 395.9, which corresponds to U.S. Appl. No. 11/969,908.

Wikipedia, "History of Microsoft Windows," Wikipedia, the free encyclopedia, updated Aug. 30, 2011, http://en.wikipedia.org/wiki/History_of_Microsoft_Window, 16 pages.

* cited by examiner

PORTABLE ELECTRONIC DEVICE WITH GRAPHICAL USER INTERFACE SUPPORTING APPLICATION SWITCHING

RELATED APPLICATIONS

This application claims priority to U.S. Provisional Patent Application Nos. 60/937,993, "Portable Multifunction Device," filed Jun. 29, 2007; 60/879,469, "Portable Multifunction Device," filed Jan. 8, 2007; 60/883,809, "Portable Electronic Device Supporting Application Switching," filed Jan. 7, 2007; and 60/879,253, "Portable Multifunction Device," filed Jan. 7, 2007. All of these applications are incorporated by reference herein in their entirety.

This application is related to the following applications: (1) U.S. patent application Ser. No. 10/188,182, "Touch Pad For Handheld Device," filed on Jul. 1, 2002; (2) U.S. patent application Ser. No. 10/722,948, "Touch Pad For Handheld Device," filed on Nov. 25, 2003; (3) U.S. patent application Ser. No. 10/643,256, "Movable Touch Pad With Added Functionality," filed on Aug. 18, 2003; (4) U.S. patent application Ser. No. 10/654,108, "Ambidextrous Mouse," filed on Sep. 2, 2003; (5) U.S. patent application Ser. No. 10/840,862, "Multipoint Touchscreen," filed on May 6, 2004; (6) U.S. patent application Ser. No. 10/903,964, "Gestures For Touch Sensitive Input Devices," filed on Jul. 30, 2004; (7) U.S. patent application Ser. No. 11/038,590, "Mode-Based Graphical User Interfaces For Touch Sensitive Input Devices" filed on Jan. 18, 2005; (8) U.S. patent application Ser. No. 11/057,050, "Display Actuator," filed on Feb. 11, 2005; (9) U.S. Provisional Patent Application No. 60/658,777, "Multi-Functional Hand-Held Device," filed Mar. 4, 2005; (10) U.S. patent application Ser. No. 11/367,749, "Multi-Functional Hand-Held Device," filed Mar. 3, 2006; and (11) U.S. Provisional Patent Application No. 60/824,769, "Portable Multifunction Device," filed Sep. 6, 2006. All of these applications are incorporated by reference herein in their entirety.

TECHNICAL FIELD

The disclosed embodiments relate generally to portable electronic devices, and more particularly, to portable electronic devices that allow a user to use multiple applications in parallel.

BACKGROUND

Portable electronic devices (e.g., mobile telephones, sometimes called mobile phones, cell phones, cellular telephones, and the like) often support a variety of applications such as telephone, email, instant messaging (IM), digital camera, web browsing, etc.

Frequently, a user may prefer to start a new application without terminating or suspending an existing application. For example, if the user is having a phone call with another person, the user may need to check a city's weather forecast and then inform the other person of the weather forecast on the phone. Sometimes, the user may like to respond to an incoming IM message while chatting with the other person on the phone at the same time.

But this multitasking feature on the same portable device has not been well supported by existing products. Currently, a cell phone user has to suspend or even terminate the phone call in order to activate another application on the same device. This restriction is especially inconvenient if the purpose of invoking the other application relates to the ongoing phone call.

Accordingly, there is a need for a portable multifunction device that allows a user to start another application while the user is continuing a phone call.

SUMMARY

The above deficiencies and other problems associated with known portable devices are reduced or eliminated by the disclosed portable multifunction device. In some embodiments, the portable electronic device has a touch-sensitive display (also known as a "touch screen" or "touch screen display") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. Instructions for performing operations may be included in one or more programs, stored on a computer readable storage medium, configured for execution by one or more processors.

One aspect of the invention is a computer-implemented method in which a portable electronic device with a touch screen displays on the touch screen display a user interface for a phone application during a phone call. The method includes detecting activation of a menu icon or menu button during the phone call, and in response to detecting activation of the menu icon or menu button, replacing the user interface for the phone application with a menu of application icons including an icon for the phone application. The method further includes maintaining the phone call while displaying the menu of application icons on the touch screen display detecting a finger gesture on an application icon in the menu of application icons other than the phone application icon, and in response to detecting the finger gesture on the application icon other than the phone application icon, displaying a user interface for a corresponding application on the touch screen display while continuing to maintain the phone call, wherein the user interface for the corresponding application includes a switch application icon that is not displayed in the user interface for the corresponding application when there is no ongoing phone call. The method also includes detecting a finger gesture on the switch application icon, and in response to detecting the finger gesture on the switch application icon, replacing display of the user interface for the corresponding application with a respective user interface for the phone application while continuing to maintain the phone call.

Another aspect of the invention is a portable electronic device having a touch screen display, one or more processors, memory, and one or more programs. The one or more program are stored in the memory and configured to be executed by the one or more processors. The one or more programs include instructions for performing the aforementioned computer-implemented method. Yet another aspect of the invention is a computer readable storage medium storing one or more programs that include instructions for performing the aforementioned computer-implemented method.

Another aspect of the invention is a computer-implemented method in which a portable electronic device with a touch screen provides a phone call service to a user of the device, and while providing the phone call service, provides a non-telephone service to the user in response to a user selection of a non-telephone service icon on the touch screen display.

Another aspect of the invention is a computer-implemented method in which a portable electronic device with a touch screen, while providing a phone call service, displays an application menu user interface, the application menu user interface including a telephone service icon and a non-telephone service icon. The method further includes displaying a phone call service user interface in response to a user selection of the telephone service icon, and displaying a non-telephone service user interface in response to a user selection of the non-telephone service icon.

Another aspect of the invention is a portable electronic device having a touch screen display, one or more processors, memory, and one or more programs. The one or more program are stored in the memory and configured to be executed by the one or more processors. The one or more programs include: instructions for providing a phone call service to a user of the device; and instructions for providing a non-telephone service to the user in response to a user selection of a non-telephone service icon on the touch screen display while providing the phone call service.

Another aspect of the invention is a portable electronic device having a touch screen display, one or more processors, memory, and one or more programs. The one or more program are stored in the memory and configured to be executed by the one or more processors. The one or more programs include: instructions for displaying an application menu user interface while providing a telephone service, the application menu user interface including a telephone service icon and a non-telephone service icon; instructions for displaying a phone call service user interface in response to a user selection of the telephone service icon while providing the telephone service; and instructions for displaying a non-telephone service user interface in response to a user selection of the non-telephone service icon while providing the telephone service.

Another aspect of the invention is a computer readable storage medium storing one or more programs that include instructions, which when executed by a portable electronic device with a touch screen display, cause the device to provide a phone call service to a user of the device, and while providing the phone call service, provide a non-telephone service to the user in response to a user selection of a non-telephone service icon on the touch screen display.

Another aspect of the invention is a computer readable storage medium storing one or more programs that include instructions, which when executed by a portable electronic device with a touch screen display, cause the device to display an application menu user interface while providing a phone call service. The application menu user interface includes a telephone service icon and a non-telephone service icon. The computer readable storage medium also stores instruction to display a phone call service user interface in response to a user selection of the telephone service icon while providing the phone call service, and instructions to display a non-telephone service user interface in response to a user selection of the non-telephone service icon while providing the phone call service.

Another aspect of the invention is a graphical user interface (GUI) on a portable electronic device with a touch screen display. The GUI has an application menu user interface while the portable electronic device providing a phone call service, wherein the application menu user interface includes a telephone service icon and a non-telephone service icon. The GUI further includes a phone call service user interface that is displayed on the touch screen display in response to a user selection of the telephone service icon, and a non-telephone service user interface that is displayed on the touch screen display in response to a user selection of the non-telephone service icon.

Another aspect of the invention is a portable electronic device having a touch screen display, means for providing a phone call service to a user of the device, and means for providing a non-telephone service to the user in response to a user selection of a non-telephone service icon on the touch screen display while the device providing the phone call service.

Another aspect of the invention is a portable electronic device having a touch screen display and means for displaying an application menu user interface on the touch screen display while providing a phone call service, the application menu user interface including a telephone service icon and a non-telephone service icon. The device further includes means for displaying a phone call service user interface on the touch screen display in response to a user selection of the telephone service icon while providing the phone call service, and means for displaying a non-telephone service user interface on the touch screen display in response to a user selection of the non-telephone service icon while providing the phone call service.

Thus, the invention provides a transparent and intuitive user interface for application switching on a portable electronic device with a touch screen display.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1:
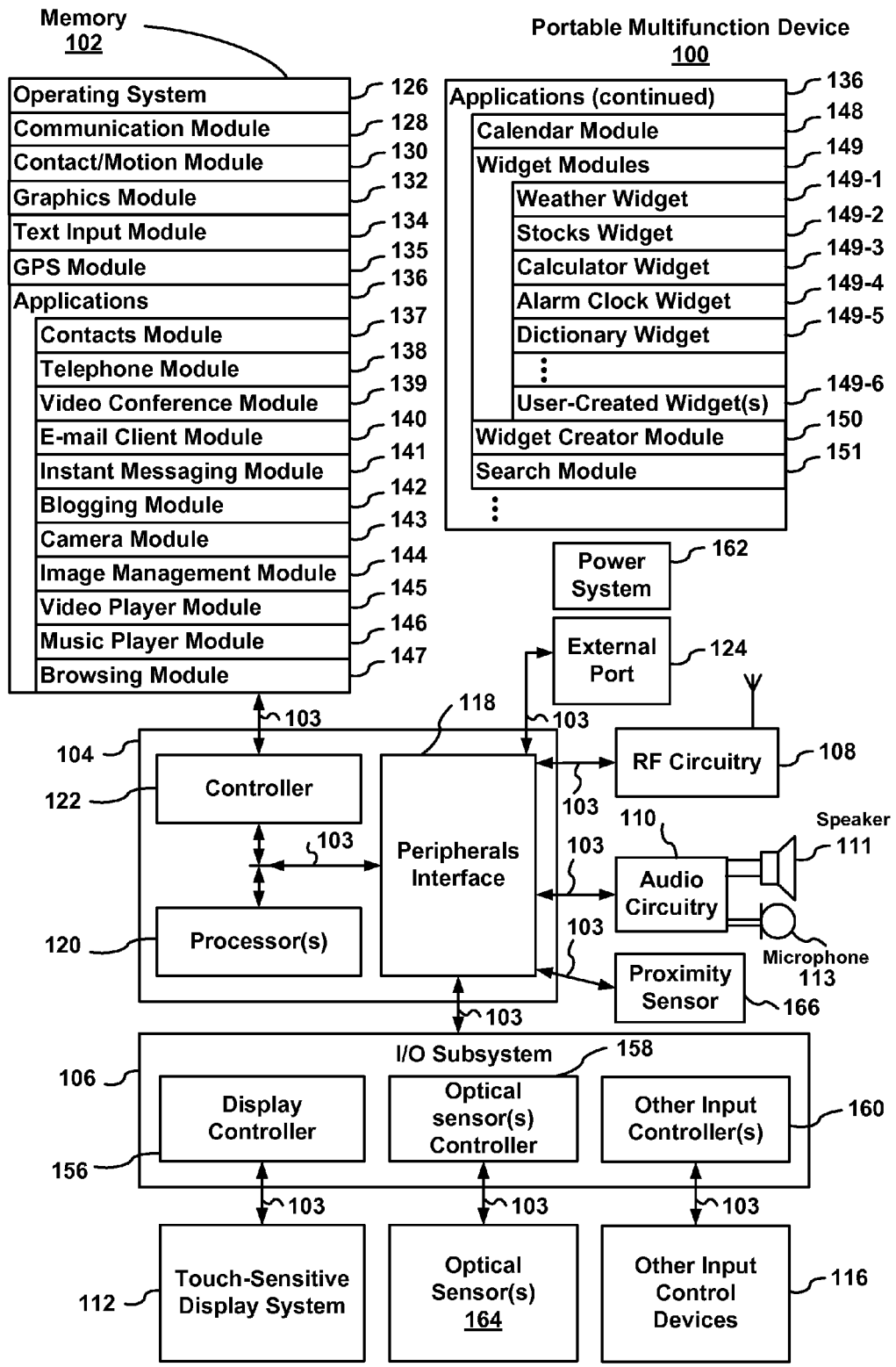
FIG. 1 is a block diagram illustrating a portable electronic device with a touch-sensitive display in accordance with some embodiments.

Reference will now be made in detail to embodiments, examples of which are illustrated in the accompanying drawings. In the following description, numerous specific details are set forth in order to provide a thorough understanding of the invention. However, it will be apparent to one skilled in the art that the invention may be practiced without these specific details. In other instances, well-known methods, procedures, components, circuits, and networks have not been described in detail so as not to unnecessarily obscure aspects of the embodiments.

Embodiments of a portable electronic device, user interfaces for such devices, and associated processes for using such devices are described. In some embodiments, the portable electronic device is a portable communications device such as a mobile telephone that also contains other functions, such as PDA and/or music player functions.

The user interface may include a physical click wheel in addition to a touch screen or a virtual click wheel displayed on the touch screen. A click wheel is a physical user-interface device that may provide navigation commands based on an angular displacement of the wheel or a point of contact with the wheel by a user of the portable electronic device. A click wheel may also be used to provide a user command corresponding to selection of one or more items, for example, when the user of the portable electronic device presses down on at least a portion of the wheel or the center of the wheel. Alternatively, breaking contact with a click wheel image on a touch screen surface may indicate a user command corresponding to selection. For simplicity, in the discussion that follows, a portable electronic device that includes a touch screen is used as an exemplary embodiment. It should be understood, however, that some of the user interfaces and associated processes may be applied to other devices, such as personal computers and laptop computers, which may include one or more other physical user-interface devices, such as a physical click wheel, a physical keyboard, a mouse and/or a joystick.

The device supports a variety of applications, such as a telephone application, a video conferencing application, an e-mail application, an instant messaging application, a blogging application, a digital camera application, a digital video camera application, a web browsing application, a digital music player application, and/or a digital video player application.

The various applications that may be executed on the portable electronic device may use at least one common physical user-interface device, such as the touch screen. One or more functions of the touch screen as well as corresponding information displayed on the portable electronic device may be adjusted and/or varied from one application to the next and/or within a respective application. In this way, a common physical architecture (such as the touch screen) of the portable electronic device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. Nos. 11/459,606, "Keyboards For Portable Electronic Devices," filed Jul. 24, 2006, and 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable electronic device may utilize common and/or different keyboard embodiments. Thus, the keyboard embodiment used may be tailored to at least some of the applications. In some embodiments, one or more keyboard embodiments may be tailored to a respective user. For example, based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Attention is now directed towards embodiments of the portable electronic device. FIG. 1 is a block diagram illustrating a portable electronic device 100 with a touch-sensitive display 112 in accordance with some embodiments. The touch-sensitive display 112 is sometimes called a "touch screen" for convenience. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the portable electronic device 100 is only one example of a portable electronic device 100, and that the portable electronic device 100 may have more or fewer components than shown, may combine two or more components, or a may have a different configuration or arrangement of the components. The various components shown in FIG. 1 may be implemented in hardware, software or a combination of hardware and software, including one or more signal processing and/or application specific integrated circuits.

Memory 102 includes one or more memory devices, each of which comprises, or a plurality of which collectively comprise a computer readable storage medium. Memory 102 may include high-speed random access memory and may also include non-volatile memory, such as one or more magnetic disk storage devices, optical disk storage devices, flash memory devices, or other non-volatile solid-state memory devices. Access to memory 102 by other components of the portable electronic device 100, such as the CPU 120 and the peripherals interface 118, may be controlled by the memory controller 122.

The peripherals interface 118 couples the input and output peripherals of the portable electronic device to the CPU 120 and memory 102. The one or more processors 120 run or execute various software programs and/or sets of instructions stored in memory 102 to perform various functions for the portable electronic device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 110, the speaker 111, and the microphone 113 provide an audio interface between a user and the portable electronic device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (not shown). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the portable electronic device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the portable electronic device, as described in U.S. patent application Ser. No. 11/322,549 (Unlocking a Device by Performing Gestures on an Unlock Image, filed Dec. 23, 2005), which is hereby incorporated by reference in its entirety. A longer press of the push button (e.g., 206) may turn power to the portable electronic device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the portable electronic device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen in the touch screen 112 and the user corresponds to a finger of the user.

The touch screen in the touch screen 112 may use LCD (liquid crystal display) technology, or LPD (light emitting polymer display) technology, although other display technologies may be used in other embodiments. The touch screen in the touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen in the touch screen 112. A touch-sensitive display in some embodiments of the touch screen 112 may be analogous to the multi-touch sensitive tablets described in the following U.S. Pat. Nos. 6,323,846 (Westerman et al.), 6,570,557 (Westerman et al.), and/or 6,677,932 (Westerman), and/or U.S. Patent Publication 2002/0015024A1, each of which is hereby incorporated by reference in its entirety. However, a touch screen in the touch screen 112 displays visual output from the portable device 100, whereas touch sensitive tablets do not provide visual output. The touch screen in the touch screen 112 may have a resolution in excess of 100 dpi. In an exemplary embodiment, the touch screen in the display system has a resolution of approximately 168 dpi. The user may make contact with the touch screen in the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the portable electronic device translates the rough finger-based input into a precise pointer/cursor position or command for performing the actions desired by the user.

A touch-sensitive display in some embodiments of the touch screen 112 may be as described in the following applications: (1) U.S. patent application Ser. No. 11/381,313, "Multipoint Touch Surface Controller," filed on May 2, 2006; (2) U.S. patent application Ser. No. 10/840,862, "Multipoint Touchscreen," filed on May 6, 2004; (3) U.S. patent application Ser. No. 10/903,964, "Gestures For Touch Sensitive Input Devices," filed on Jul. 30, 2004; (4) U.S. patent application Ser. No. 11/048,264, "Gestures For Touch Sensitive Input Devices," filed on Jan. 31, 2005; (5) U.S. patent application Ser. No. 11/038,590, "Mode-Based Graphical User Interfaces For Touch Sensitive Input Devices," filed on Jan. 18, 2005; (6) U.S. patent application Ser. No. 11/228,758, "Virtual Input Device Placement On A Touch Screen User Interface," filed on Sep. 16, 2005; (7) U.S. patent application Ser. No. 11/228,700, "Operation Of A Computer With A Touch Screen Interface," filed on Sep. 16, 2005; (8) U.S. patent application Ser. No. 11/228,737, "Activating Virtual Keys Of A Touch-Screen Virtual Keyboard," filed on Sep. 16, 2005; and (9) U.S. patent application Ser. No. 11/367,749, "Multi-Functional Hand-Held Device," filed on Mar. 3, 2006. All of these applications are incorporated by reference herein in their entirety.

In some embodiments, in addition to the touch screen, the portable electronic device 100 may include a touchpad (not shown) for activating or deactivating particular functions. In some embodiments, the touchpad is a touch-sensitive area of the portable electronic device that, unlike the touch screen, does not display visual output. The touchpad may be a touch-sensitive surface that is separate from the touch screen in the touch screen 112 or an extension of the touch-sensitive surface formed by the touch screen.

In some embodiments, the portable electronic device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable electronic devices.

The device 100 may also include one or more optical sensors 164. FIG. 1 shows an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143, the optical sensor 164 may capture still images or video. In some embodiments, an optical sensor is located on the back of the portable electronic device 100, opposite the touch screen display 112 on the front of the portable electronic device, so that the touch screen display may be used as a viewfinder for either still and/or video image acquisition. In some embodiments, an optical sensor is located on the front of the portable electronic device so that the user's image may be obtained for videoconferencing while the user views the other video conference participants on the touch screen display. In some embodiments, the position of the optical sensor 164 can be changed by the user (e.g., by rotating the lens and the sensor in the portable electronic device housing) so that a single optical sensor 164 may be used along with the touch screen display for both video conferencing and still and/or video image acquisition.

The device 100 may also include one or more proximity sensors 166. FIG. 1 shows a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. Nos. 11/241,839, "Proximity Detector In Handheld Device," filed Sep. 30, 2005, and 11/240,788, "Proximity Detector In Handheld Device," filed Sep. 30, 2005, which are hereby incorporated by reference in their entirety. In some embodiments, the proximity sensor turns off and disables the touch screen 112 when the multifunction device is placed near the user's ear (e.g., when the user is making a phone call). In some embodiments, the proximity sensor keeps the screen off when the portable electronic device is in the user's pocket, purse, or other dark area to prevent unnecessary battery drainage when the portable electronic device is a locked state.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen in the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen in the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel 116.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the portable electronic device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:
- a contacts module 137 (sometimes called an address book or contact list);
- a telephone module 138;
- a video conferencing module 139;
- an e-mail client module 140;
- an instant messaging (IM) module 141;
- a blogging module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6; and/or
- search module 151.

Examples of other applications 136 that may be stored in memory 102 include memo pad and other word processing applications, JAVA-enabled applications, encryption, digital rights management, voice recognition, and voice replication.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies. Embodiments of user interfaces and associated processes using telephone module 138 are described further below.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images. Embodiments of user interfaces and associated processes using image management module 144 are described further below.

Note that the above identified modules and applications (including the telephone module 138 and the image management module 144) correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, the portable electronic device 100 is a device where operation of a predefined set of functions on the portable electronic device is performed exclusively through a touch screen in the touch screen 112 and/or a touchpad. By using a touch screen and/or a touchpad as the primary input/control device for operation of the portable electronic device 100, the number of physical input/control devices (such as push buttons, dials, and the like) on the portable electronic device 100 may be reduced.

The predefined set of functions that may be performed exclusively through a touch screen and/or a touchpad include navigation between user interfaces. In some embodiments, the touchpad, when touched by the user, navigates the portable electronic device 100 to a main, home, or root menu from any user interface that may be displayed on the portable electronic device 100. In such embodiments, the touchpad may be referred to as a "menu button." In some other embodiments, the menu button may be a physical push button or other physical input/control device instead of a touchpad.

Figure 2:
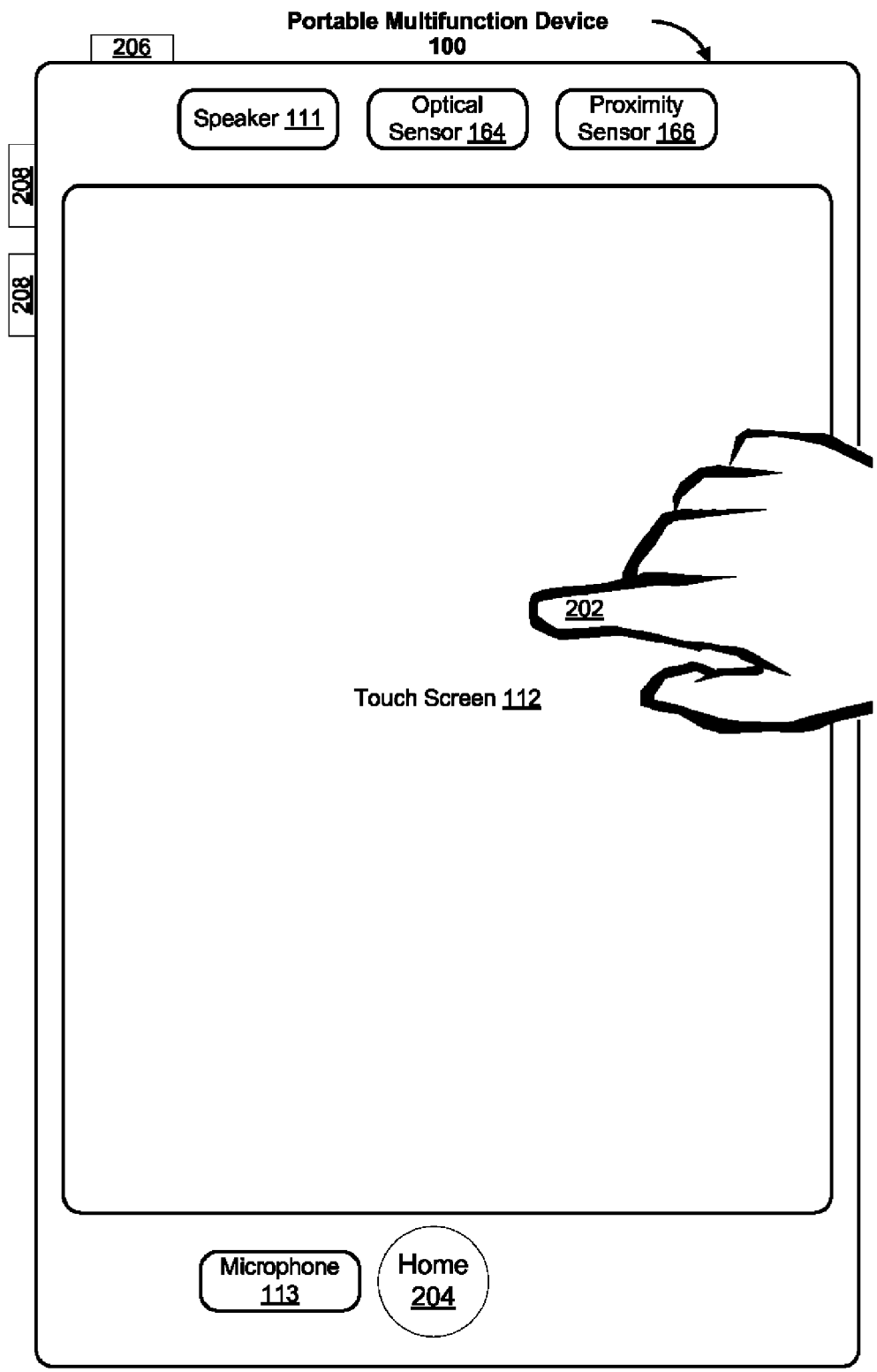
FIG. 2 illustrates a portable electronic device having a touch screen in accordance with some embodiments.

FIG. 2 illustrates a portable electronic device 100 having a touch screen 112 in accordance with some embodiments. The touch screen may display one or more graphics. In this embodiment, as well as others described below, a user may select one or more of the graphics by making contact or touching the graphics, for example, with one or more fingers 202 (not drawn to scale in the figure) or a stylus (not shown in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the portable electronic device 100. In some embodiments, inadvertent contact with a graphic may not select the graphic. For example, a swipe gesture with that sweeps over an application icon may not select the corresponding application when the gesture corresponding to selection is a tap. In other words, the portable electronic device 100 interprets the meaning of a gesture and acts accordingly after considering which application or module is in use at the moment.

The device 100 may also include one or more physical buttons, such as "home" or menu button 204. As described previously, the menu button 204 may be used to navigate to any application 136 in a set of applications that may be executed on the portable electronic device 100. Alternatively, in some embodiments, the menu button is implemented as a soft key in a GUI in touch screen 112.

In one embodiment, the portable electronic device 100 includes a touch screen 112, a menu button 204, a push button 206 for powering the portable electronic device on/off and locking the portable electronic device, and volume adjustment button(s) 208. The push button 206 may be used to turn the power on/off on the portable electronic device by depressing the button and holding the button in the depressed state for a predefined time interval; to lock the portable electronic device by depressing the button and releasing the button before the predefined time interval has elapsed; and/or to unlock the portable electronic device or initiate an unlock process. In an alternative embodiment, the portable electronic device 100 also may accept verbal input for activation or deactivation of some functions through the microphone 113.

Attention is now directed towards embodiments of user interfaces ("UI") and associated processes that may be implemented on a portable electronic device 100.

Figure 3:
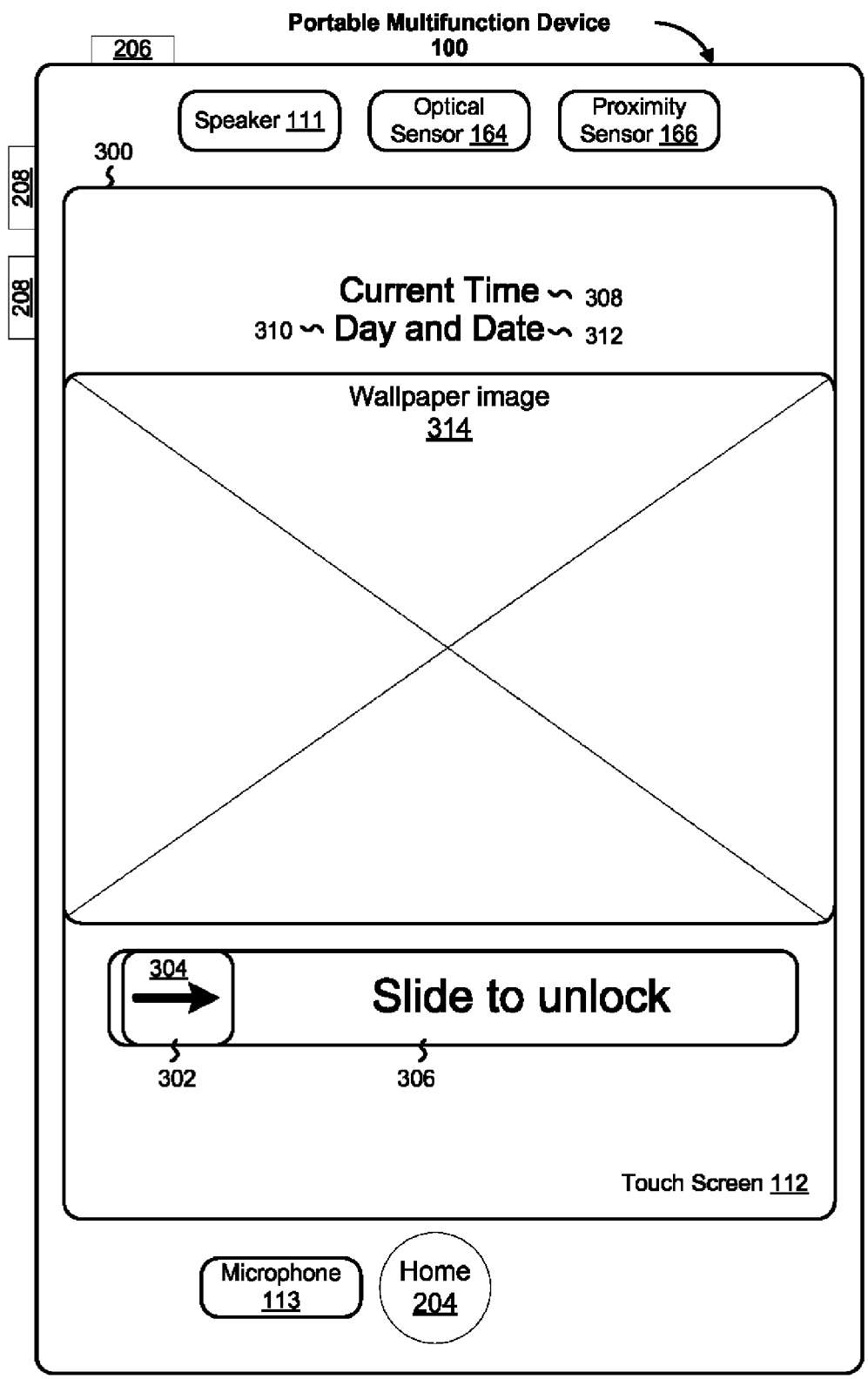
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:

Unlock image 302 that is moved with a finger gesture to unlock the portable electronic device;
Arrow 304 that provides a visual cue to the unlock gesture;
Channel 306 that provides additional cues to the unlock gesture;
Time 308;
Day 310;
Date 312; and
Wallpaper image 314.

In some embodiments, the portable electronic device detects contact with the touch-sensitive display (e.g., a user's finger making contact on or near the unlock image 302) while the portable electronic device is in a user-interface lock state. The device moves the unlock image 302 in accordance with the contact. The device transitions to a user-interface unlock state if the detected contact corresponds to a predefined gesture, such as moving the unlock image across channel 306. Conversely, the portable electronic device maintains the user-interface lock state if the detected contact does not correspond to the predefined gesture. As noted above, processes that use gestures on the touch screen to unlock the portable electronic device are described in U.S. patent application Ser. No. 11/322,549, "Unlocking a Device by Performing Gestures on an Unlock Image," filed Dec. 23, 2005, which is hereby incorporated by reference in its entirety.

Figure 4:
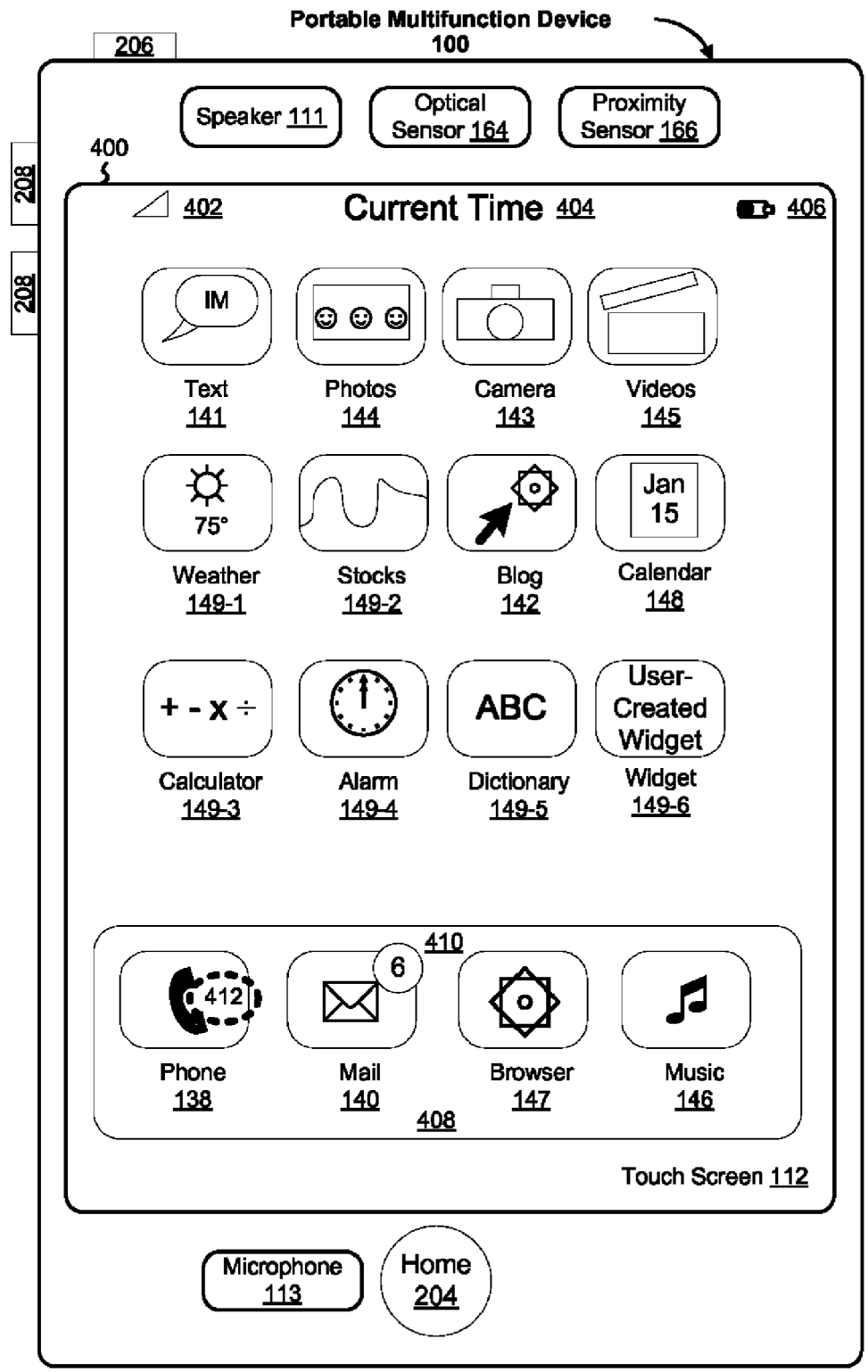
FIG. 4 illustrates an exemplary user interface for a menu of applications on a portable electronic device in accordance with some embodiments.

FIG. 4 illustrates an exemplary user interface for a menu of applications on a portable electronic device in accordance with some embodiments. In some embodiments, user interface 400 includes the following elements, or a subset or superset thereof:

Signal strength indicator 402 for wireless communication;
Current time indicator 404;
Battery status indicator 406;
Tray 408 with icons for frequently used applications, such as:
Phone application 138;
E-mail client 140, which may include an indicator 410 of the number of unread e-mails;
Browser 147; and
Music player 146; and
Icons for other applications, such as:
IM 141;
Image management 144;
Camera 143;
Video player 145;
Weather 149-1;
Stocks 149-2;
Blog 142;
Calendar 148;
Calculator 149-3;
Alarm clock 149-4;
Dictionary 149-5; and
User-created widget 149-6.

In some embodiments, UI 400 displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400 provides integrated access to both widget-based applications and non-widget-based applications. In some embodiments, all of the widgets, whether user-created or not, are displayed in UI 400. In other embodiments, activating the icon for user-created widget 149-6 may lead to another UI (not shown) that contains the user-created widgets or icons corresponding to the user-created widgets.

In some embodiments, a user may rearrange the icons in UI 400, e.g., using processes described in U.S. patent application Ser. No. 11/459,602, "Portable Electronic Device With Interface Reconfiguration Mode," filed Jul. 24, 2006, which is hereby incorporated by reference in its entirety. For example, a user may move application icons in and out of tray 408 using finger gestures.

In some embodiments, UI 400 includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference in its entirety.

Figure 5:
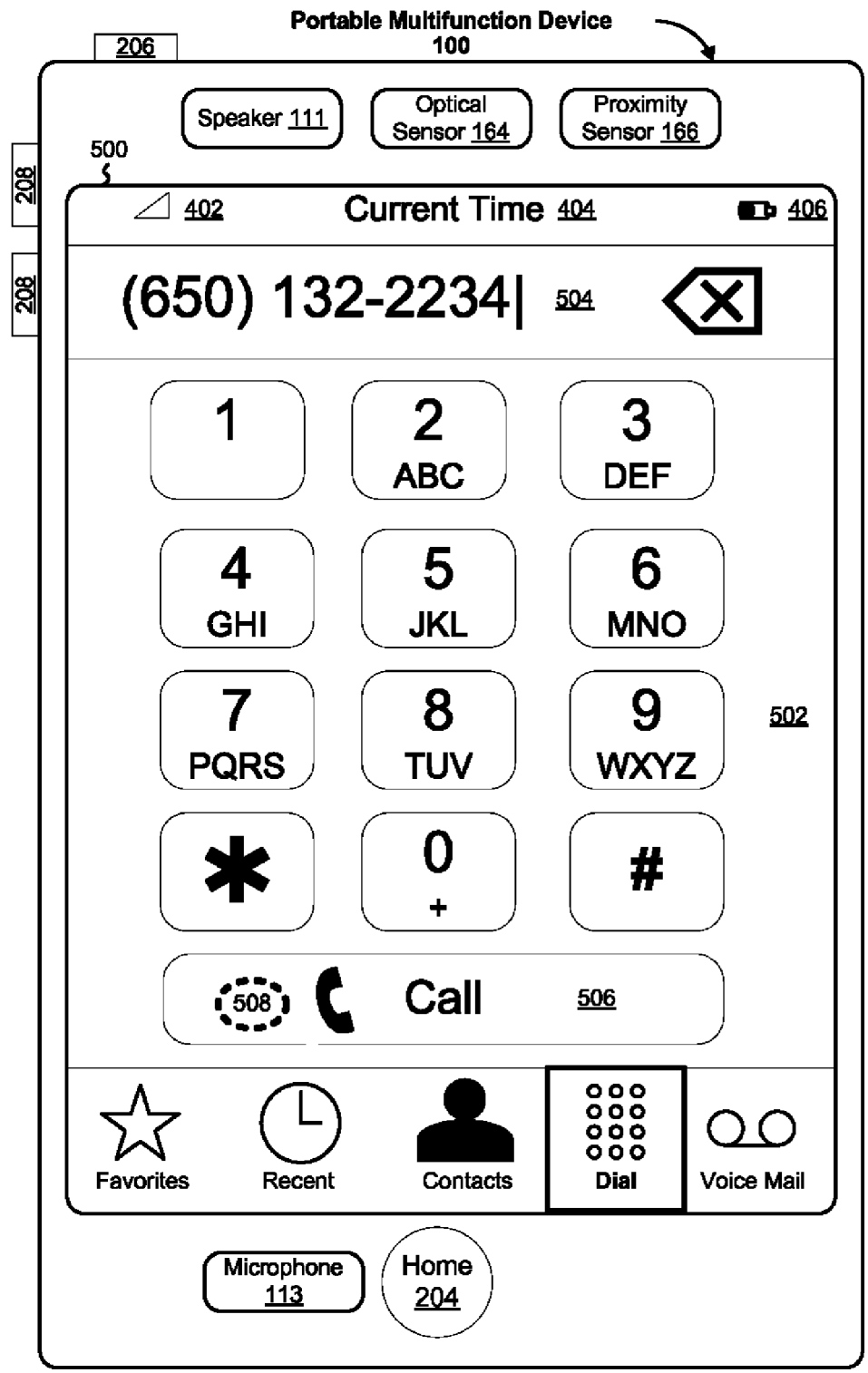
FIG. 5 illustrates an exemplary dial pad interface for calling in accordance with some embodiments.

In some embodiments, a user starts a phone call by first applying a finger tap 412 on the telephone module icon 138, which is also referred to as "telephone service icon." FIG. 5 illustrates an exemplary dial pad interface for calling in response to the user selection of the telephone service icon in accordance with some embodiments. In response to the user activating the number keys in dial pad 502 (e.g., by finger taps on the number icons), the touch screen displays the selected digits 504. In some embodiments, the telephone module 138 automatically adds the parentheses and dashes to the selected digits to make the number easier to read. In response to the user selection 508 of the initiate phone call icon 506, the phone module dials or transmits the user-selected digits.

Figure 6A:
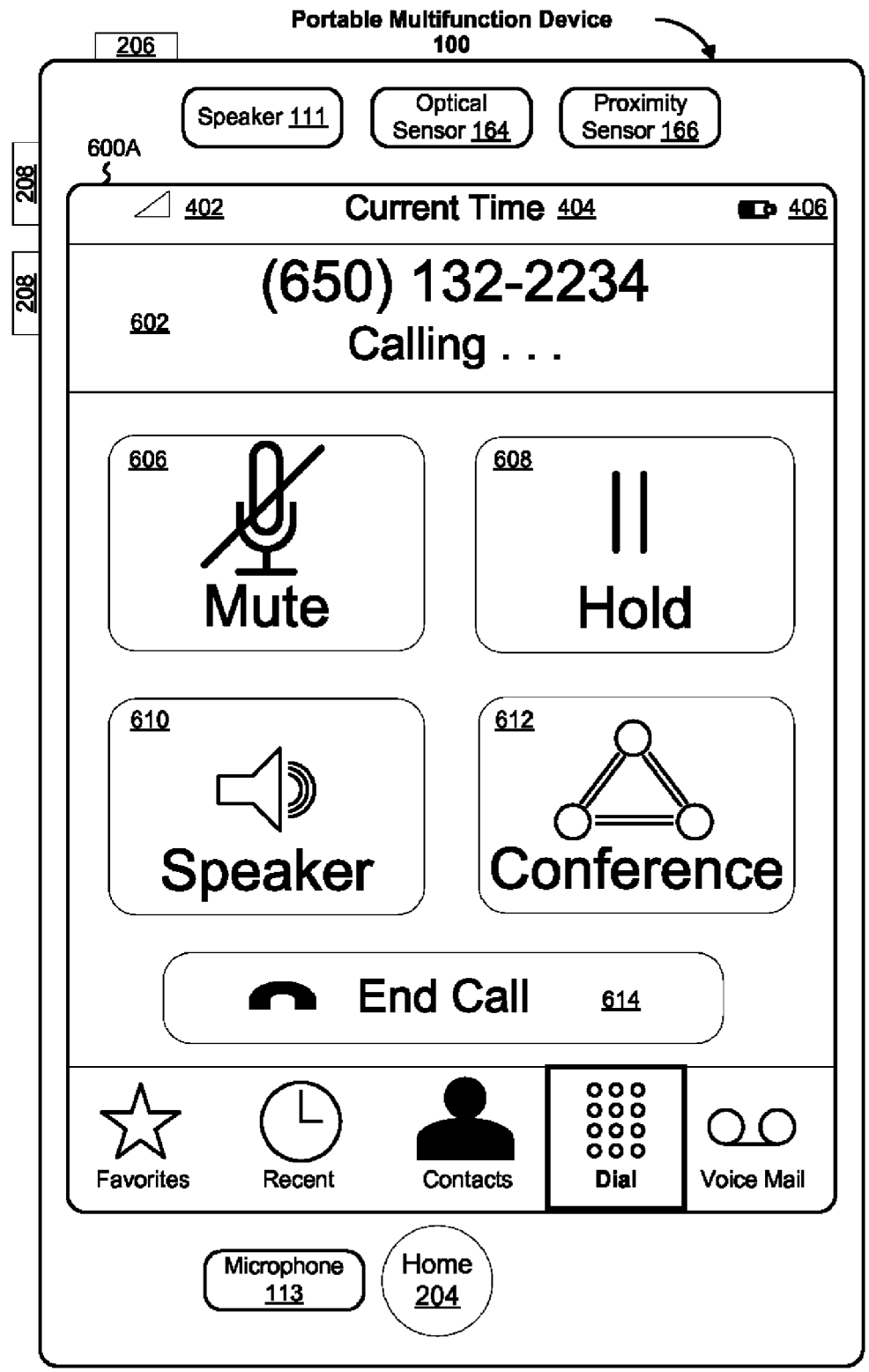
FIGS. 6A through 6C illustrate exemplary phone call service user interfaces in accordance with some embodiments.
Figure 6B:
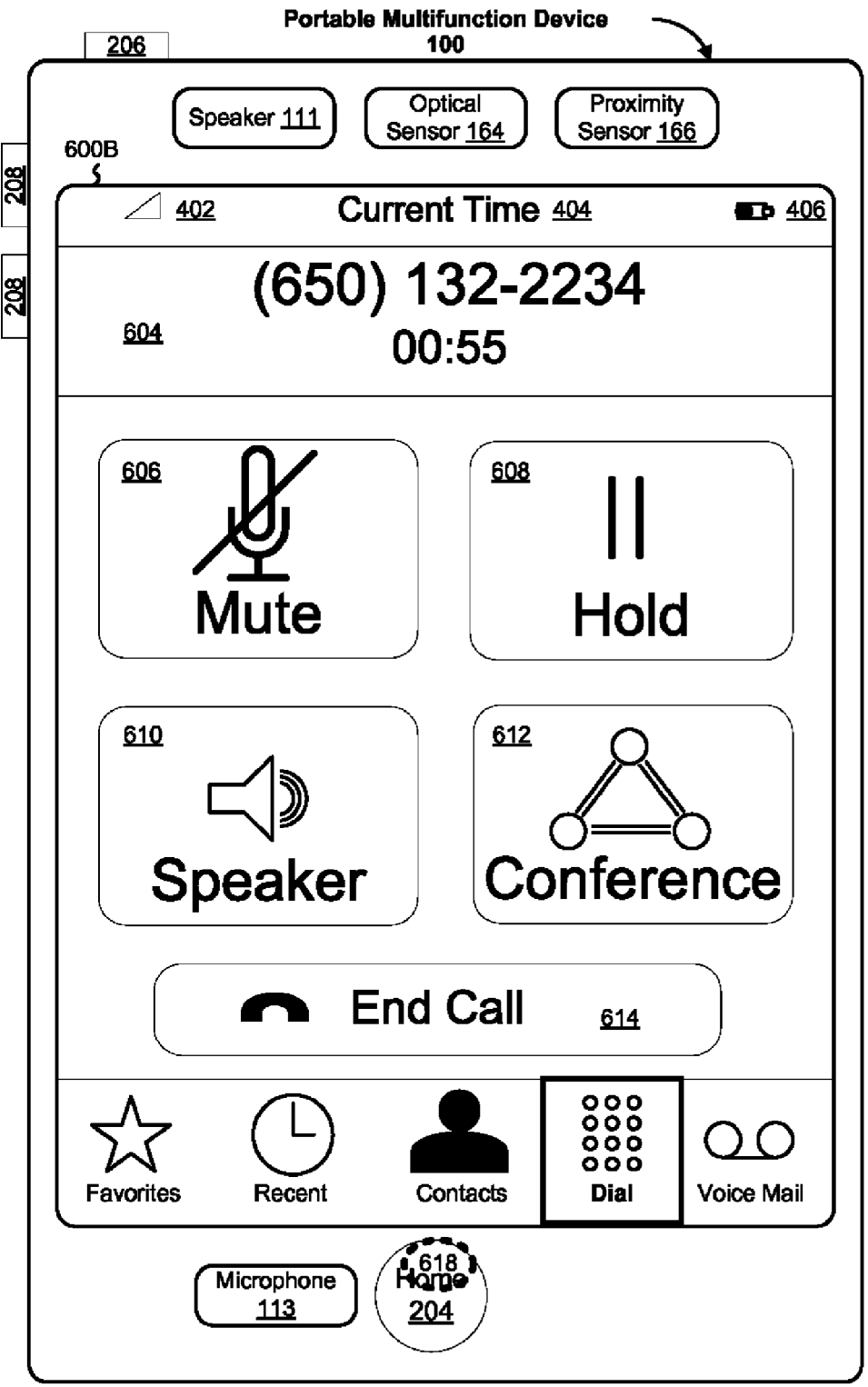
Figure 6C:
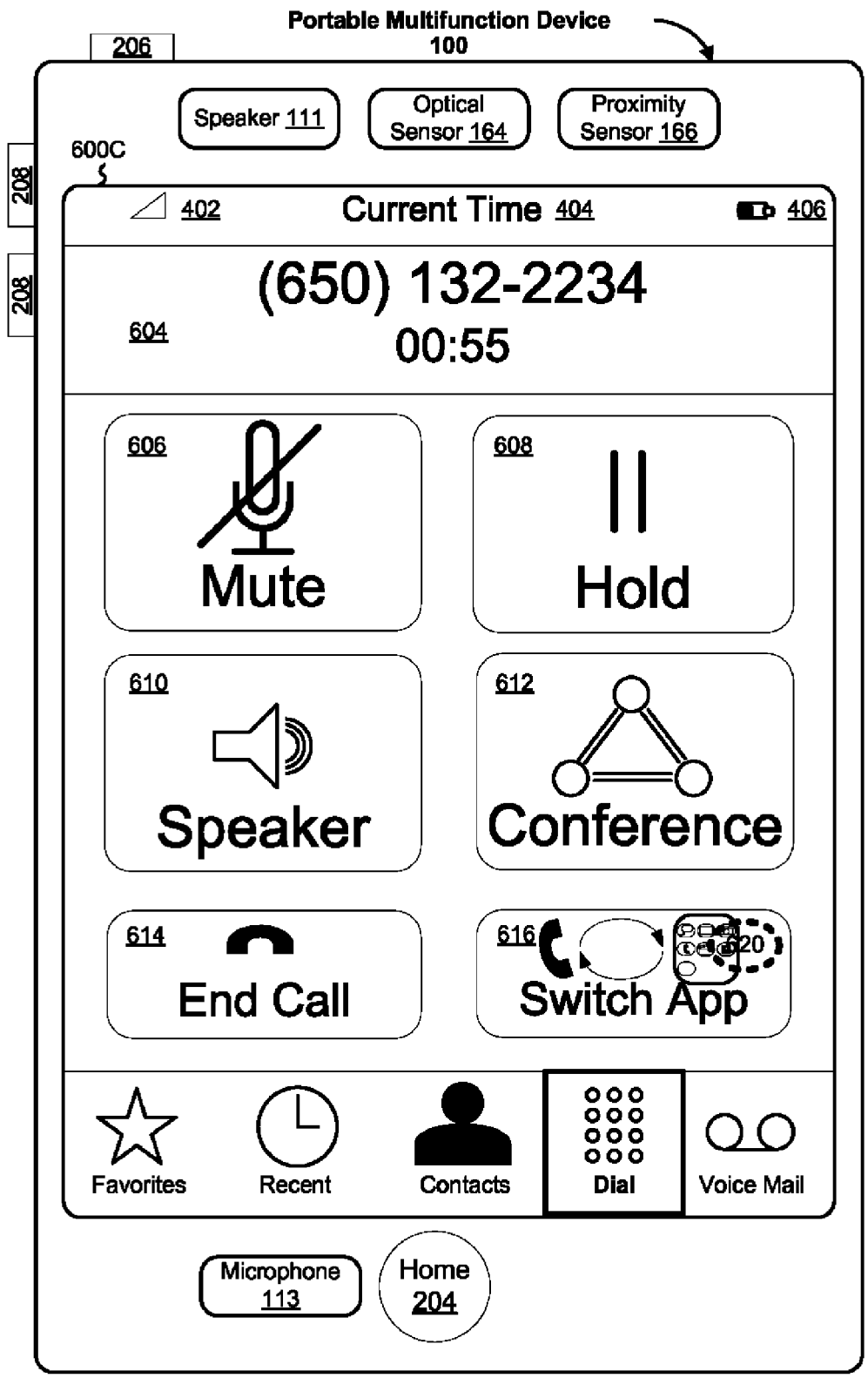

FIGS. 6A through 6C illustrate exemplary phone call service user interfaces in accordance with some embodiments. In some embodiments, the UI 600A (FIG. 6A) indicates that a call is being attempted 602 and the UI 600B (FIG. 6B) indicates the connection time 604 after the connection is made.

In some embodiments, in response to a finger tap or other predefined user gesture, the device may: mute the call (e.g., if the gesture is applied to icon 606); place the call on hold (e.g., if the gesture is applied to icon 608); place the call on a speaker (e.g., if the gesture is applied to icon 610); set up a conference call (e.g., if the gesture is applied to icon 612); or terminate the call (e.g., if the gesture is applied to icon 614).

As noted above, in some embodiments, a user may like to switch to another application without suspending or terminating an existing phone call. This application switch feature is different from placing a phone call on hold that allows a user to suspend the existing phone call, initiate a new phone call or answer another incoming call, and resume the suspended phone call by finger tapping the icon 608. As will be better understood after reviewing the following explanation, placing a phone call on hold does not allow the portable device to switch from the telephone module 138 to another application displayed in the application menu user interface 400. Nor does placing a phone call on hold allow two distinct applications, such as the telephone service and a non-telephone service, to operate simultaneously.

When switching to the other application, the user can continue a phone call (i.e., continue participating in the call, talking and listening). In some embodiments, this application switch is triggered by the ongoing phone call itself. For example, the user may need to get a person's contact information through the contacts module 137 and then provide such information to the other party of the phone call. In some other embodiments, this application switch may have nothing to do with the ongoing phone call itself. For example, the user may like to respond to an instant message that just arrived at the device while chatting with the other party on the phone. In some embodiments, the ongoing phone call is an incoming call received by the user of the device. In some other embodiments, the ongoing phone call is an outgoing call initiated by the user from the portable device.

To allow a user to choose a new application, the portable electronic device first replaces the phone call service user interface with the application menu user interface, without terminating the ongoing phone call and without placing the phone call on hold. There are different events that may cause the device to switch the user interface displayed on the touch screen.

In some embodiments (UI 600B, FIG. 6B), the user may return to the application menu user interface 400 by explicitly pressing 618 the menu button 204. In some other embodiments, the portable device automatically replaces the phone call service user interface with the application menu user interface after the phone call is on for a predetermined time period (e.g., 15 to 30 minutes), which is a user-configurable parameter. In some other embodiments, the portable device returns to the application menu user interface upon detecting a triggering event (e.g., the arrival of an email message, an IM message, an appointment reminder, etc). In some embodiments, the phone call user interface (UI 600C, FIG. 6C) includes an application switch icon 616. The user can return to the application menu user interface 400 by finger tapping 620 the application switch icon 616.

Figure 7A:
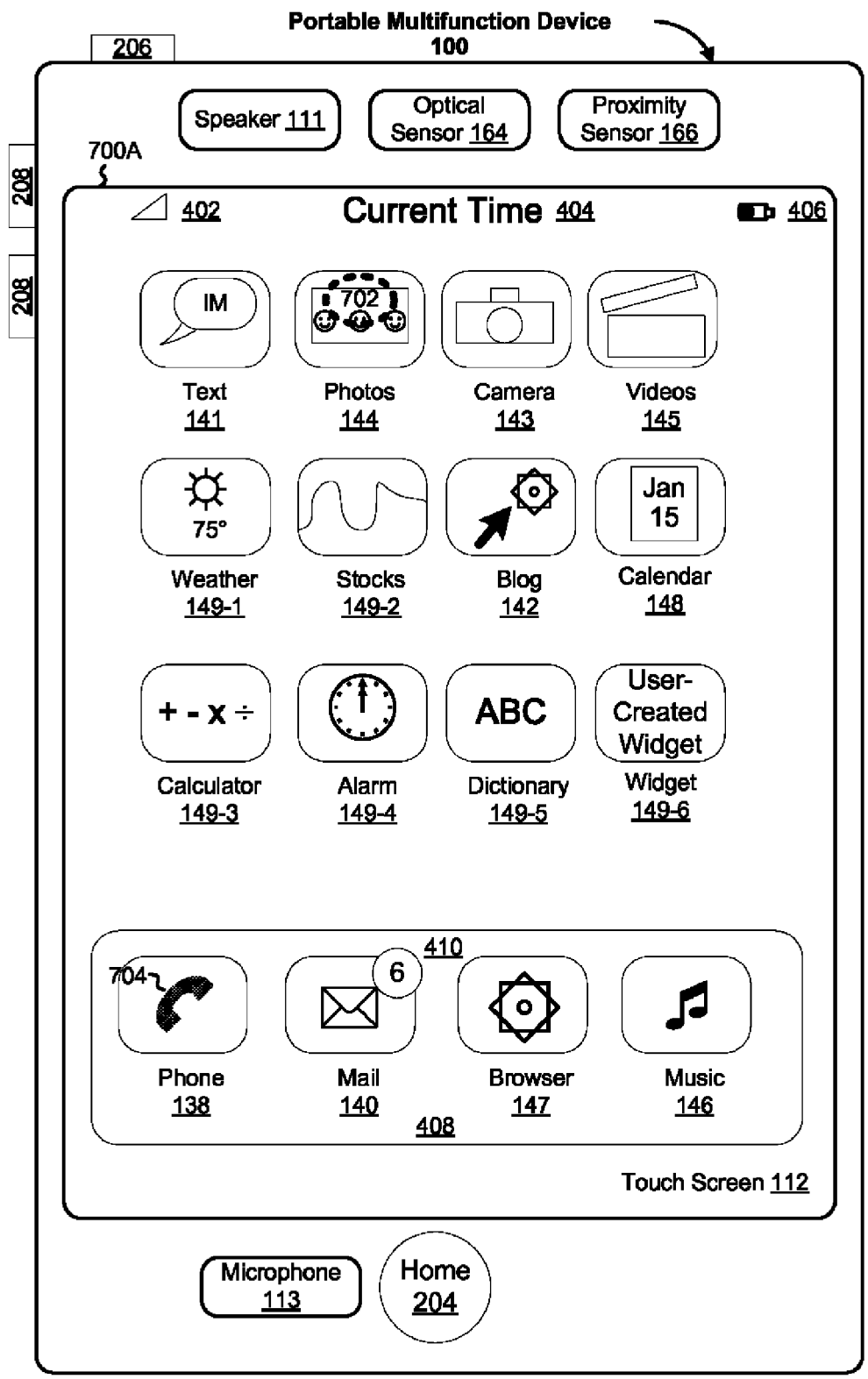
FIGS. 7A and 7B illustrate exemplary application menu user interfaces in conjunction with an ongoing phone call service in accordance with some embodiments.
Figure 7B:
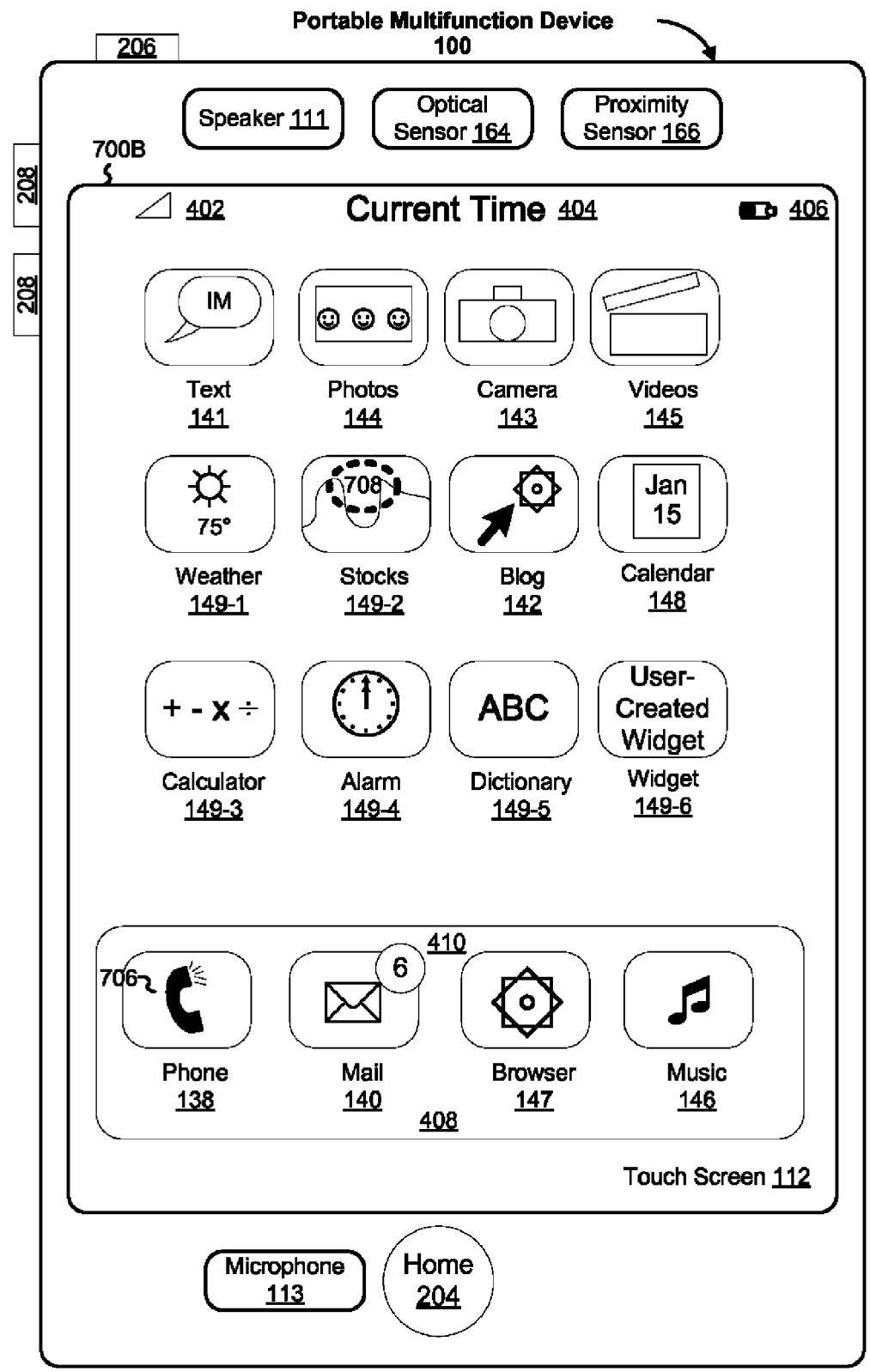

FIGS. 7A and 7B illustrate exemplary application menu user interfaces in conjunction with an ongoing phone call service in accordance with some embodiments. In some embodiments, the portable electronic device changes the telephone service icon 138's appearance to reminder the user of the ongoing phone call.

As shown in FIGS. 7A and 7B, the telephone service icon 138 may take different shapes or colors 704, 706 or both. The new shapes and colors make the telephone icon 138 easily distinguishable from other non-telephone service icons. In some embodiments, the new appearance is visually different from the icon's old appearance when there is no ongoing phone call. In some embodiments, the portable electronic device animates the telephone service icon 138 (e.g., repeatedly alternating the icon's color or rotating the icon clockwise). One skilled in the art will easily come up with many other ways of reminding the user of the ongoing phone call.

Figure 8:
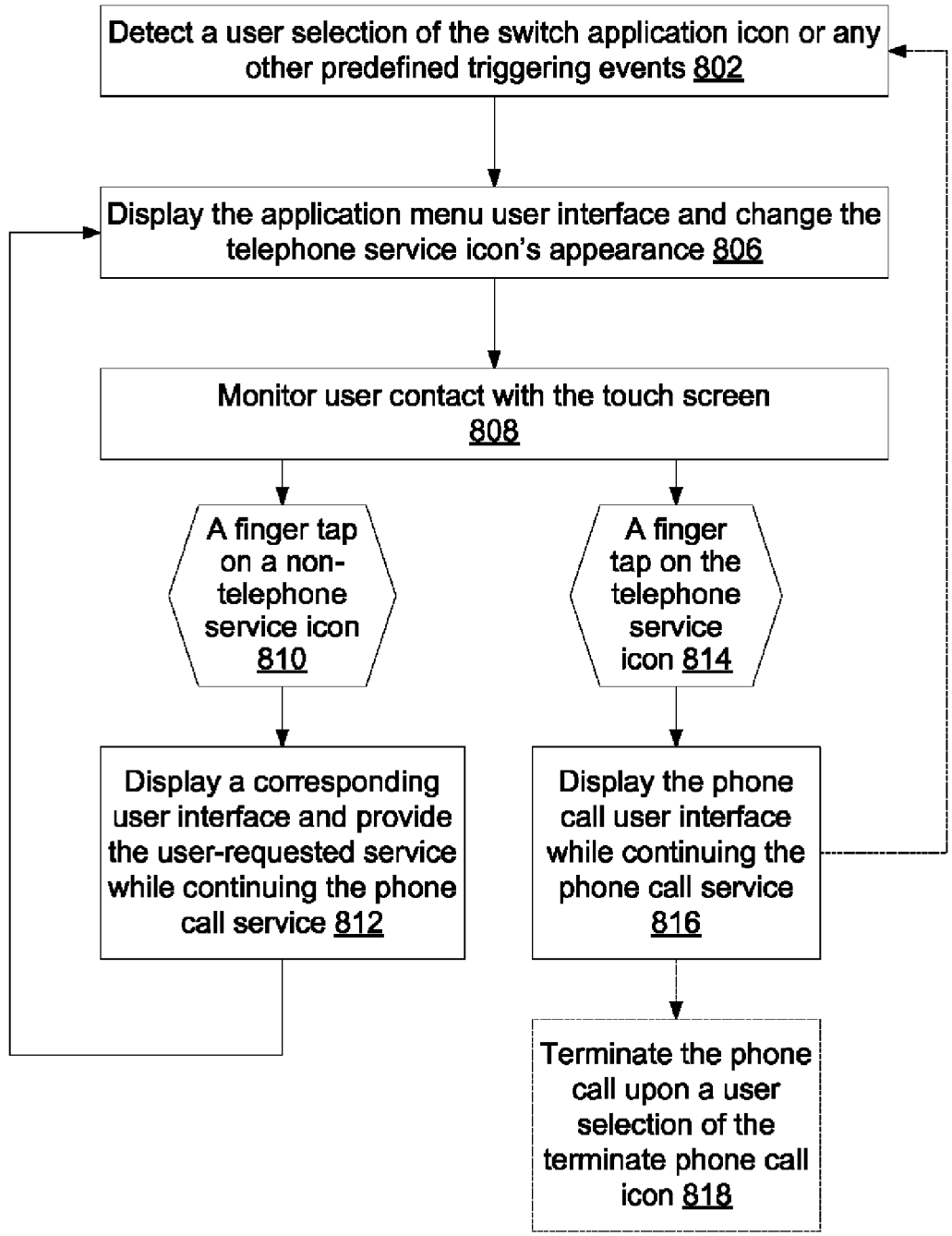
FIG. 8 is a flowchart illustrating a process for providing a telephone service and a non-telephone service simultaneously in accordance with some embodiments.

FIG. 8 is a flowchart illustrating a process for providing a telephone service and a non-telephone service simultaneously in accordance with some embodiments. Thus, in the context of the process shown in FIG. 8, an ongoing telephone call is in progress prior to and during the process, and continues without interruption until the call is terminated. Thus, the user of the device continues participating in the ongoing telephone conversation, talking and listening, while the device provides one or more non-telephone services. Of course, the user may choose the put the ongoing call on hold, but process of FIG. 8 does not require putting the ongoing telephone call on hold.

Upon detecting a user selection of the application switch icon such as the menu button 204 or another triggering event such as an incoming IM message (802), the portable electronic device replaces the phone call service user interface (600B or 600C) with the application menu user interface (700A or 700B) on the touch screen (806). In some embodiments, the telephone service icon 138 has an appearance visually different from its usual appearance as shown in FIG. 4 and/or the appearance of any other non-telephone service icon on the same application menu user interface. The portable electronic device then monitors user contact with the touch screen (808).

For example, the user may select a non-telephone service icon (810), such as the image management module 144 by a finger tap 702 (FIG. 7A) or the stocks widget 149-2 by a finger tap 708 (FIG. 7B). The non-telephone service selected by the user may be any non-telephone communication service, such as email, instant messaging, or SMS, provided by the device. The non-telephone service selected by the user may also be any other online service, such as web browsing, viewing online information such as stock quotes, weather reports or the like, viewing or participating in a blog, or any of a wide variety of other online services. In addition, the non-telephone service selected by the user may be any locally provided application, such as a calculator application, calendar application, picture taking application, photo or video viewing application, music player application, and so on. Some of the non-telephone services that the user may select at 810 may have both online and local modes of operation or online and local aspects. The portable electronic device then performs as described in U.S. Provisional Patent Application No. 60/824,769, "Portable Multifunction Device," filed Sep. 6, 2006, which is incorporated herein by reference in its entirety, including displaying a corresponding user interface and providing a user-requested service (812). At the conclusion of the user-requested service, the portable electronic device returns to the same application menu user interface such as 700A or 700B (806) and monitors next user contacts with the touch screen (808).

The user can invoke more than one non-telephone service by repeating operations 810 and 812 before returning to the phone call service user interface. In some embodiments, the portable electronic device has, e.g., a timer for monitoring how much time has elapsed after leaving the phone call service user interface. When the elapsed time reaches a predefined threshold, the portable device may pop up a small window on the touch screen reminding the user of the ongoing phone call. After finishing the non-telephone service(s), the user may return to the phone call service user interface by selecting the telephone service icon 138 (814, 816).

Figure 9:
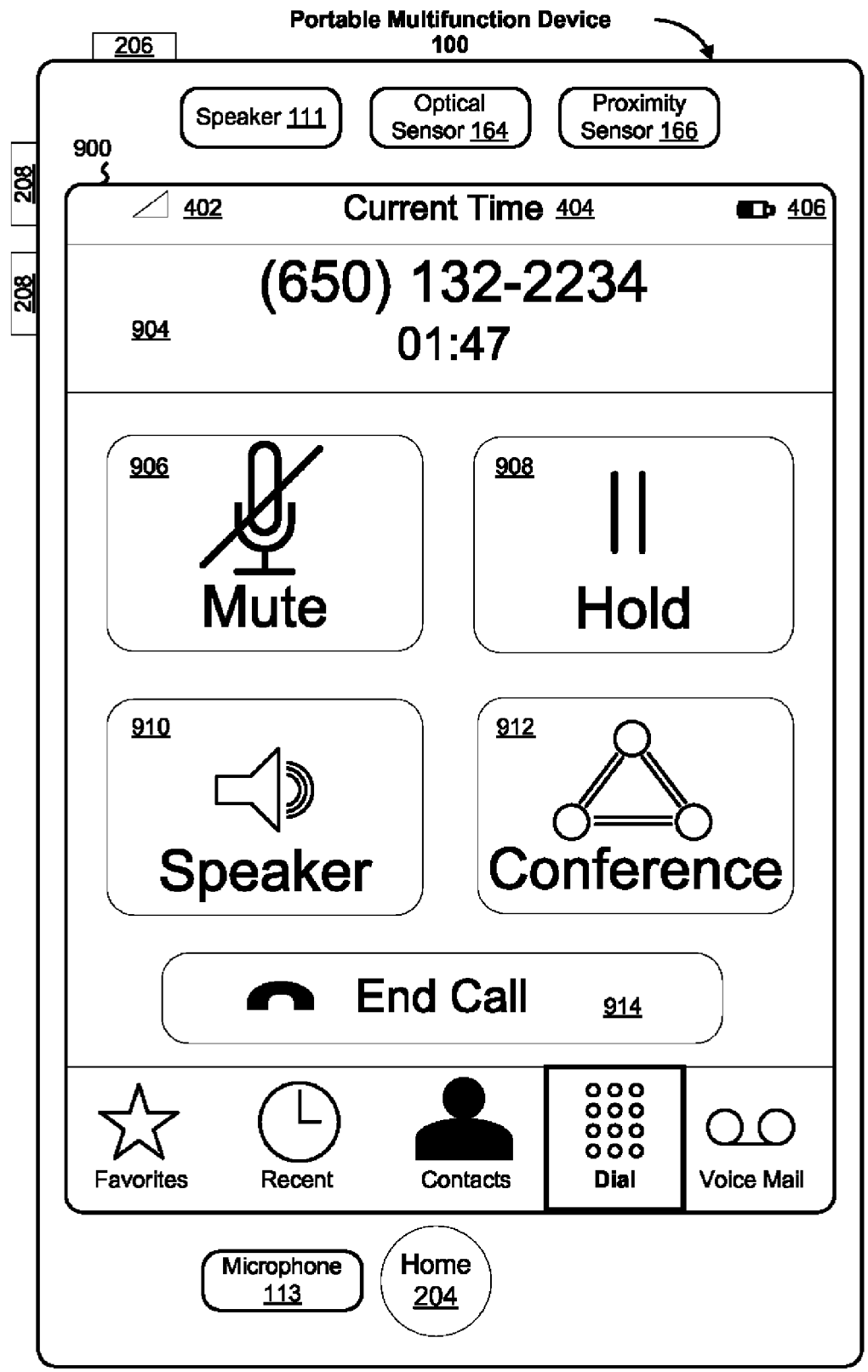
FIG. 9 illustrates an exemplary phone call user interface in accordance with some embodiments.

FIG. 9 illustrate an exemplary phone call user interface in accordance with some embodiments. In some embodiments, the portable electronic device displays the updated connection time 904. The portable electronic device may switch back to the application menu user interface if there is a triggering event (e.g., if the user selects the application switch icon again). Alternately, the portable electronic device may terminate the phone call service upon a user selection of the terminate phone call icon 914 (818).

Figure 10A:
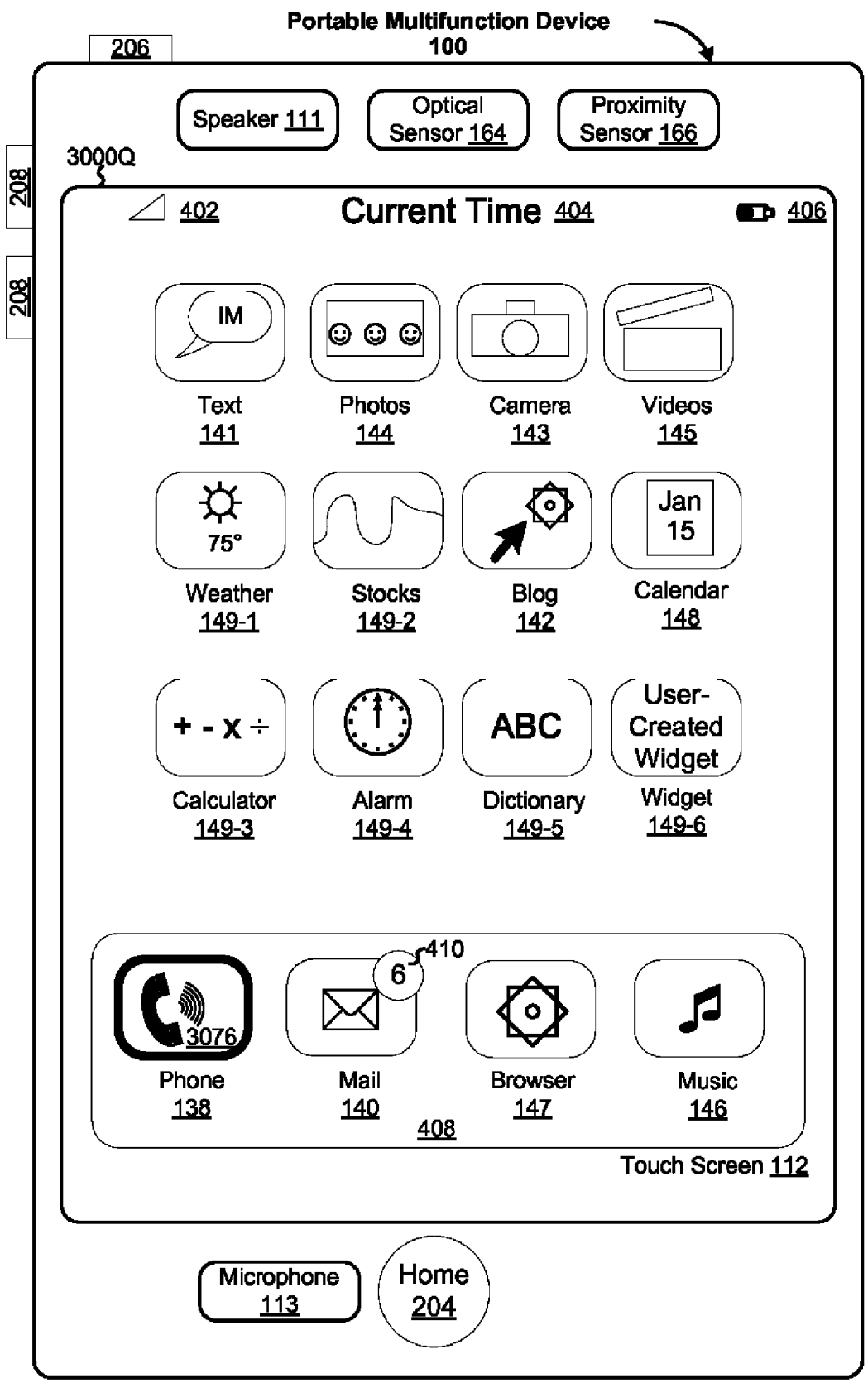
FIGS. 10A, 10B and 10C illustrate exemplary user interfaces displayed during a call in accordance with some embodiments.
Figure 10B:
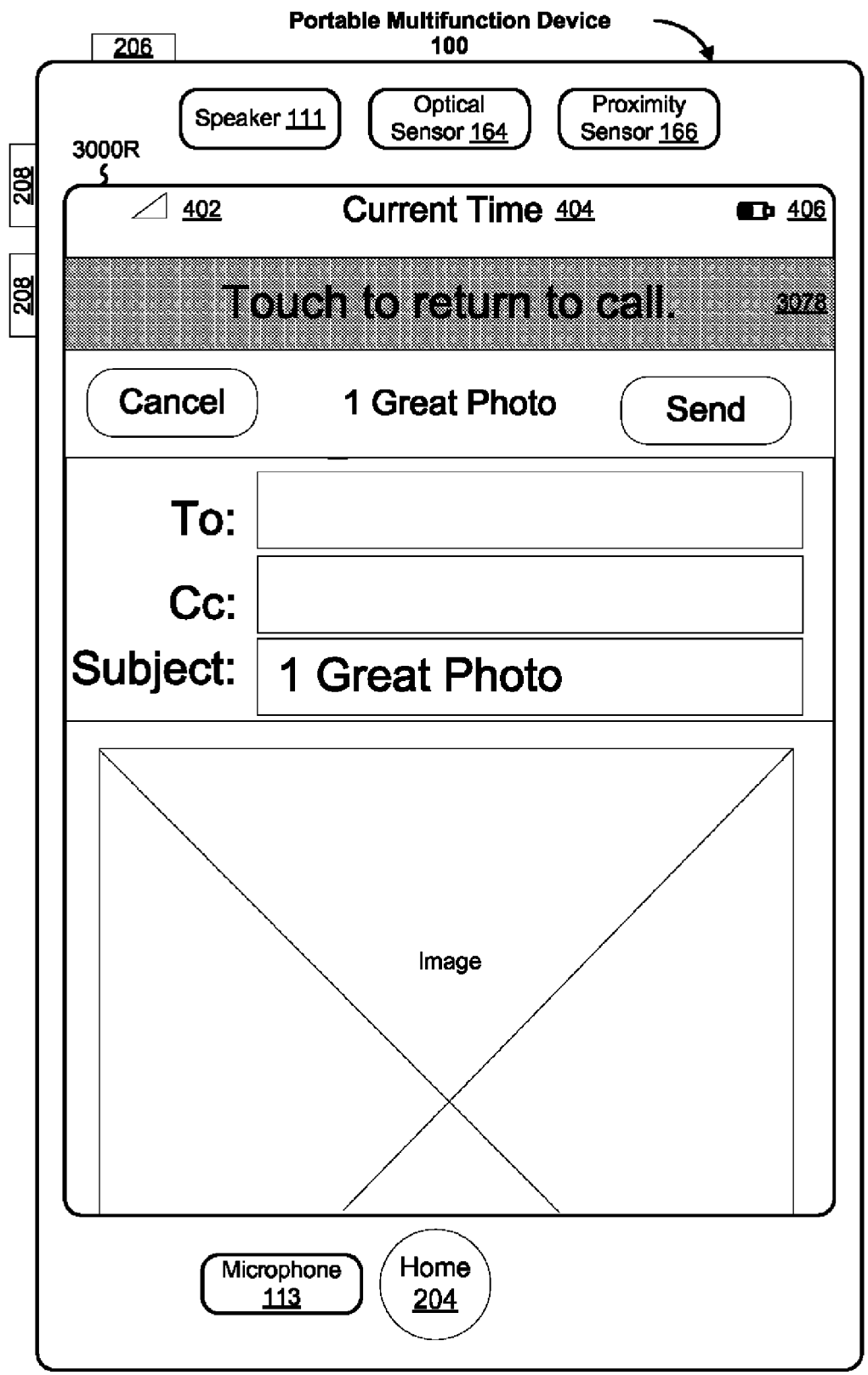
Figure 10C:
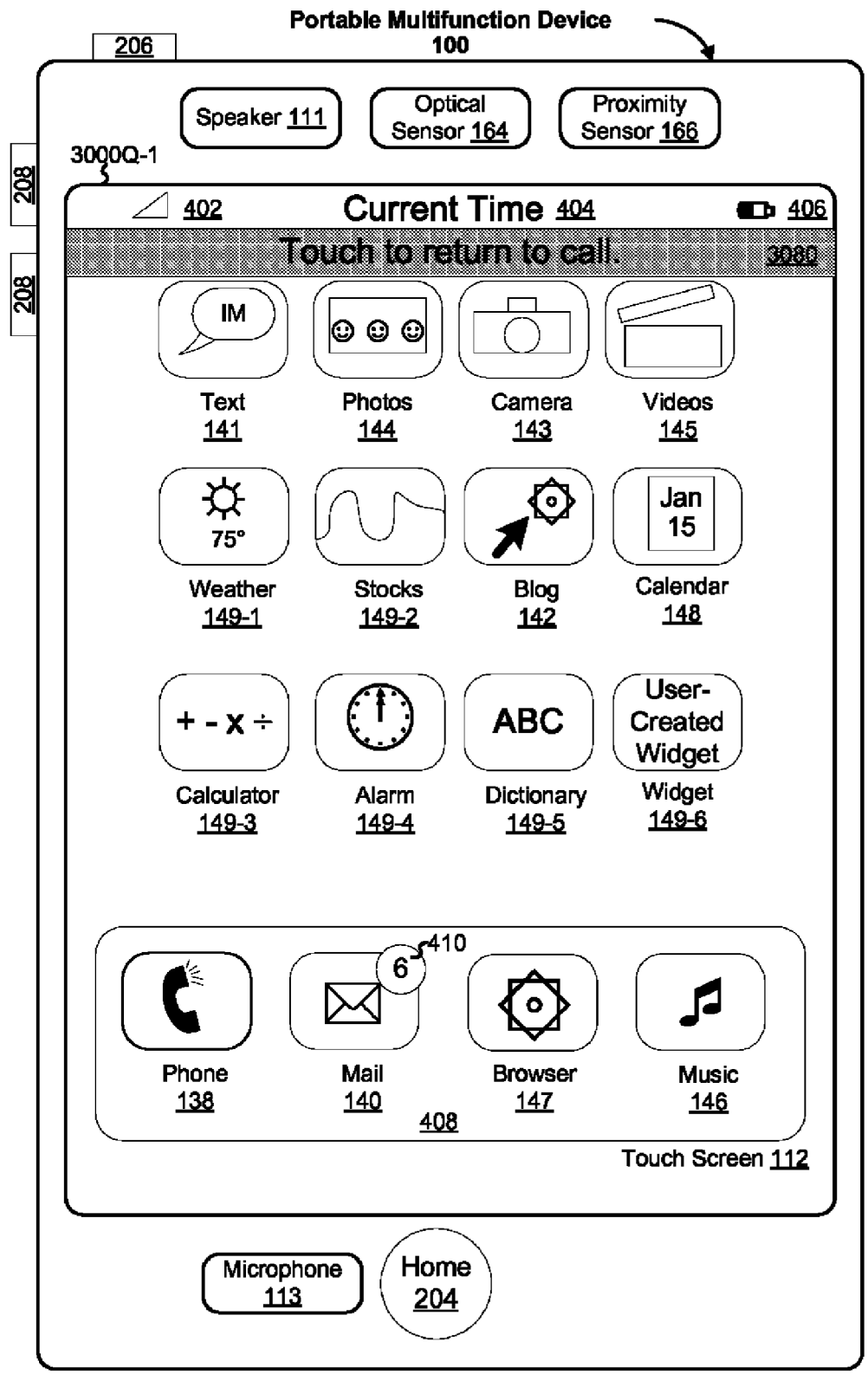
Figure 10D:
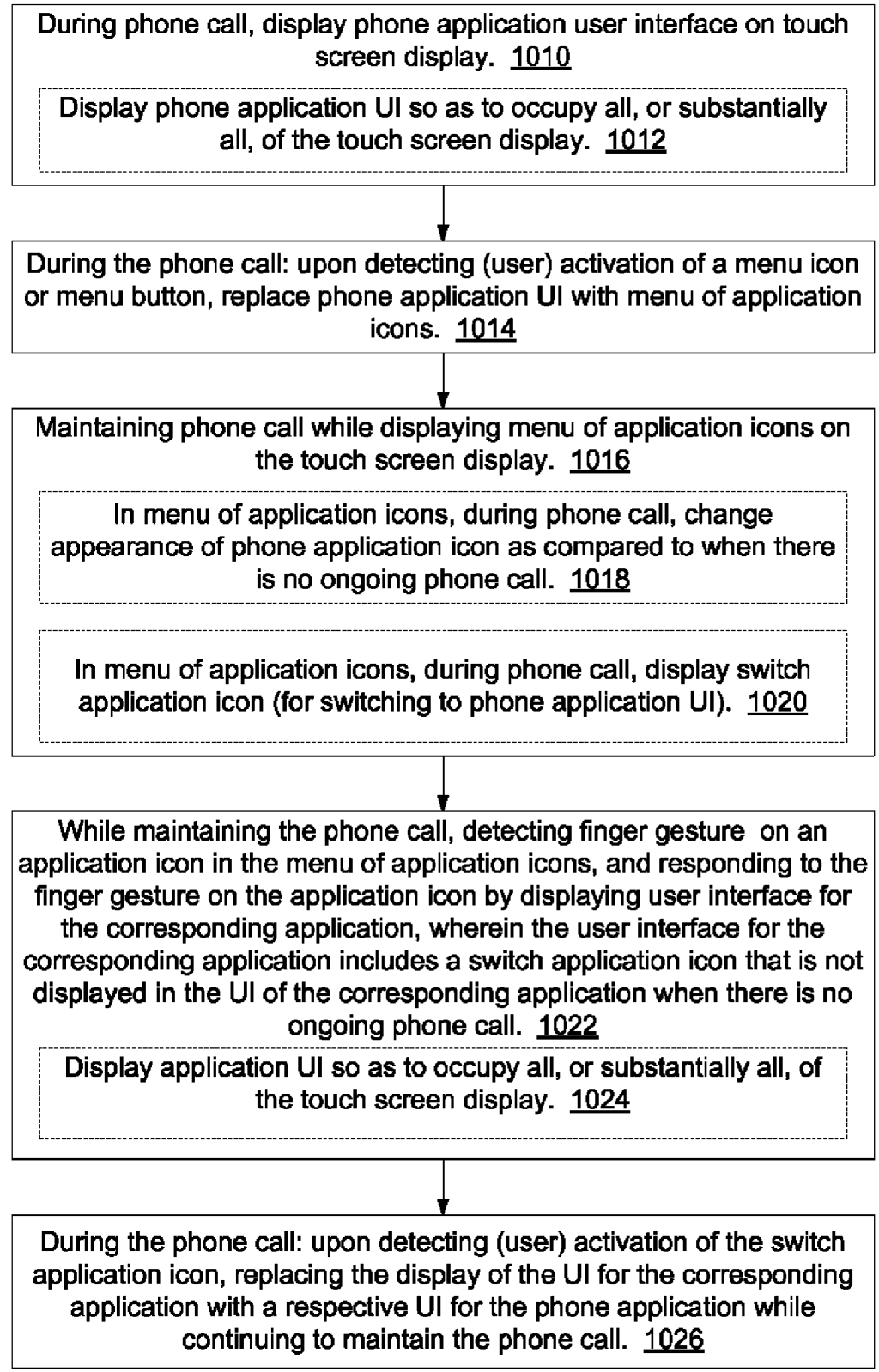
FIG. 10D is a flowchart illustrating a process, performed by a portable electronic device having a touch screen display, for switching back and forth between a telephone service and a non-telephone service while maintaining an ongoing telephone call, in accordance with some embodiments.

FIGS. 10A, 10B and 10C illustrate exemplary user interfaces displayed during a call in accordance with some embodiments. FIG. 10D is a flow chart of a method of operating a portable electronic device during a phone call. In some embodiments, the multifunction device 100 permits a user to conduct a phone call while simultaneously using other functions of the device in an intuitive manner. In some embodiments, in response to activation of a menu icon or button in a phone application user interface (e.g., activation of icon or button 204, FIG. 6B, by pressing 618 the menu icon or button with the user's finger) while a user is on a phone call, a menu of application icons (e.g., icons 141-148 and 149-1 to 149-6) is displayed on the touch screen, as shown in FIG. 10A. The menu of application icons is displayed while the device maintains the ongoing phone call. Alternately stated, the device continues to provide phone call services to the user of the device while displaying the menu of application icons.

In some embodiments, an icon for the phone application (e.g., 3076, FIG. 10A) is highlighted (or otherwise changed in appearance as compared to when the phone application is not in use) to indicate that the phone application is in use. In response to activation of the phone application icon (e.g., icon 3076), the phone application is displayed.

Still referring to FIG. 10A, in response to activation of an application icon other than the phone application icon (e.g., by a finger tap or other gesture on the application icon), a user interface of the corresponding application (e.g., a non-telephone service application) is displayed along with a switch application icon (e.g., the "touch to return to call" icon 3078, FIG. 10B). FIG. 10B shows an example of a user interface 3000R for a photo application that is displayed upon user activation of the corresponding application icon 144 (FIG. 10A). The user may operate the non-phone application in essentially the same manner as when the phone application is not simultaneously being used. However, in response to activation of the switch application icon (e.g., by a finger tap on icon 3078 in FIG. 10B), the device displays the phone application.

FIG. 10C shows an alternate embodiment of the application icons menu UI 3000Q (of FIG. 10A). The application icons menu UI 3000Q-1 includes a respective switch application icon (e.g., the "touch to return to call" icon 1080) that indicates that the phone application is in use. In response to activation of the switch application icon (e.g., by a finger tap or touch on icon 1080), the device displays a respective user interface of the phone application (e.g., UI 600B of FIG. 6B).

Referring to FIG. 10D, in some embodiments, a portable electronic device having a touch screen display is operated in the following manner while the user of the device is simultaneously participating in a phone call and also using other functions of the device. Initially, during the phone call the device displays a phone application user interface on the touch screen display (1010). Optionally, the phone application is displayed so as to occupy all or substantially all of the touch screen display (1012). For example, as shown in FIGS. 6A, 6B, 6C, user interfaces 600A, 600B, 600C of a phone application, occupy substantially all of the touch screen display. Exceptions include the signal strength indicator 402, current time indicator 404, and battery state indicator 406. In embodiments in which the menu button or icon 204 is displayed on the touch screen display, that also would not be part of the phone application user interface. In the embodiments shown in FIGS. 6A-6C, excluding the aforementioned items, the phone application occupies substantially all of the touch screen display.

Upon detecting activation of a menu icon or menu button during an ongoing phone call, the phone application user interface is replaced with a menu of application icons (1014). For example, if the home or menu button 204 of FIG. 6A, 6B or 6C is activated by a user touching the menu icon or menu button 204, the phone application user interface is replaced with a menu of application icons, examples of which are shown in FIGS. 10A and 10C. The menu of application icons includes a phone application icon. The ongoing phone call is maintained while the menu of application icons is displayed on the touch screen display (1016). The user can continue to participate (e.g., talking and/or listening) in the ongoing phone call while viewing the menu of application icons. In some embodiments, during an ongoing phone call, the appearance of the phone application icon (e.g., icon 138) in the menu of application icons is changed compared to the appearance of the phone application icon when there is no ongoing phone call (1018). This changed appearance is a visual cue that touching the phone application icon will return the device to a display of a phone application user interface. Alternately, during an ongoing phone call, a switch application icon (e.g., icon 3080, FIG. 10C) is displayed in the menu of application icons (1020). The switch application icon is a visual cue for the user. When a user activates this switch application icon, for example by touching it with a finger, the device replaces the menu of application icons with a display of a user interface of the phone application.

Upon detecting a finger gesture on an application icon in the menu of application icons other than the phone application icon, the device displays a user interface for a corresponding application (which may be called the "other application" or a "non-telephone service application" for convenience) on the touch screen display while continuing to maintain the phone call (1022). The user interface for the corresponding application includes a switch application icon (e.g., icon 3078, FIG. 10B) that is not displayed in the user interface for the corresponding application when there is no ongoing phone call (1022). In some embodiments, the user interface for the corresponding application occupies all or substantially all of the touch screen display (see above discussion as to the meaning of "substantially all" in this context) (1024). In these embodiments the display of the user interface of the corresponding application replaces the display of the menu of application icons.

Upon detecting a finger gesture on the switch application icon (e.g., icon 3078, FIG. 10B), the device replaces display of the user interface for the corresponding application with a respective user interface for the phone application while continuing to maintain the phone call (1026).

In some embodiments, the aforementioned functions for switching between the user interfaces for a phone application and a non-telephone service application are enabled when one or more proximity sensors and/or a proximity determination module or a set of proximity determination instructions of the device determine that the portable electronic device is not currently being held up against (or in very close proximity) to the user's ear or face.

In some embodiments, the speaker function of the portable electronic device, which facilitates telephone conversations while the device is held away from the user's face, is automatically enabled by the device when the user, during an ongoing telephone call, activates the menu button or icon. This enables the user to maintain participation in the ongoing telephone call while accessing one or more non-telephone service applications of the device, without requiring the user to activate a speaker icon (e.g., icon 610, FIG. 6A) in the user interface of the phone application before activating the menu button or icon.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
    at a portable electronic device with a touch screen display:
        displaying on the touch screen display a first user interface for a phone application during a phone call;
        detecting activation of a menu icon or menu button during the phone call,
        in response to detecting activation of the menu icon or menu button, replacing the first user interface for the phone application with a menu of application icons including an icon for the phone application and an icon for a non-telephone application;
        maintaining the phone call while displaying the menu of application icons on the touch screen display;
        detecting a finger gesture on an application icon in the menu of application icons other than the phone application icon;
        in response to detecting the finger gesture on the application icon other than the phone application icon, displaying a corresponding application user interface on the touch screen display while continuing to maintain the phone call and modifying the corresponding application user interface to include a switch application icon that is not displayed in the corresponding application user interface when there is no ongoing phone call;
        detecting a finger gesture on the touch screen display on the switch application icon; and
        in response to detecting the finger gesture on the switch application icon, replacing display of the corresponding application user interface with the first user interface for the phone application while continuing to maintain the phone call.

2. The method of claim 1, including displaying the user interface for the phone application, during the phone call, so as to occupy all or substantially all of the touch screen display with the user interface for the phone application.

3. The method of claim 1, wherein, when displaying the menu of application icons in response to detecting activation of the menu icon or menu button, including an icon for the phone application, the phone application icon is changed in appearance as compared to when there is no ongoing phone call.

4. The method of claim 1, including, while displaying the menu of application icons in response to detecting activation of the menu icon or menu button and while continuing to maintain the phone call, displaying a switch application icon in the menu of application icons that is not displayed in the menu of application icons when there is no ongoing phone call, wherein in response to detecting activation of the switch application icon in the menu of application icons, the device replaces the menu of application icons with a display of the user interface of the phone application.

5. The method of claim 1, including displaying the corresponding application user interface so as to occupy all or substantially all of the touch screen display with the corresponding application user interface while continuing to maintain the phone call.

6. The method of claim 1, including, in response to said detecting activation of the menu icon or menu button during the phone call, concurrently activating a speaker function for the phone call.

7. A portable electronic device, comprising:
    a touch screen display;
    one or more processors;
    memory; and
    a program, wherein the program is stored in the memory and configured to be executed by the one or more processors, the program further including instructions for:
        displaying on the touch screen display a first user interface for a phone application during a phone call;
        detecting activation of a menu icon or menu button during the phone call;
        responding to activation of the menu icon or menu button by replacing the first user interface for the phone application with a menu of application icons including an icon for the phone application and an icon for a non-telephone application;
        maintaining the phone call while displaying the menu of application icons on the touch screen display;
        detecting a finger gesture on an application icon in the menu of application icons other than the phone application icon;
        responding to detecting the finger gesture on the application icon other than the phone application icon, by displaying a corresponding application user interface on the touch screen display while continuing to maintain the phone call and modifying the corresponding application user interface to include a switch application icon that is not displayed in the corresponding application user interface when there is no ongoing phone call;
        detecting a finger gesture on the touch screen display on the switch application icon; and
        responding to detecting the finger gesture on the switch application icon, by replacing display of the corresponding application user interface with the first user interface for the phone application while continuing to maintain the phone call.

8. The device of claim 7, including instructions for: while displaying the menu of application icons in response to detecting activation of the menu icon or menu button and while continuing to maintain the phone call, displaying a switch application icon in the menu of application icons that is not displayed in the menu of application icons when there is no ongoing phone call, wherein in response to detecting activation of the switch application icon in the menu of application icons, the device replaces the menu of application icons with a display of the user interface of the phone application.

9. The device of claim 7, including instructions for: in response to said detecting activation of the menu icon or menu button during the phone call, concurrently activating a speaker function for the phone call.

10. The portable electronic device of claim 7, the one or more programs further including instructions for displaying the user interface for the phone application, during the phone call, so as to occupy all or substantially all of the touch screen display with the user interface for the phone application.

11. The portable electronic device of claim 7, wherein, when displaying the menu of application icons in response to detecting activation of the menu icon or menu button, including an icon for the phone application, the phone application icon is changed in appearance as compared to when there is no ongoing phone call.

12. The portable electronic device of claim 7, the one or more programs further including instructions for displaying the corresponding application user interface so as to occupy all or substantially all of the touch screen display with the corresponding application user interface-while continuing to maintain the phone call.

13. A non-transitory computer readable storage medium storing one or more programs, including instructions, which when executed by a portable multifunction device with a touch screen display, cause the device to:
   display on the touch screen display a first user interface for a phone application during a phone call;
   detect activation of a menu icon or menu button during the phone call,
   respond to activation of the menu icon or menu button by replacing the first user interface for the phone application with a menu of application icons including an icon for the phone application and an icon for a non-telephone application;
   maintain the phone call while displaying the menu of application icons on the touch screen display;
   detect a finger gesture on an application icon in the menu of application icons other than the phone application icon;
   respond to the finger gesture on the application icon other than the phone application icon by displaying a corresponding application user interface on the touch screen display while continuing to maintain the phone call and modifying the corresponding application user interface to include a switch application icon that is not displayed in the corresponding application user interface when there is no ongoing phone call;
   detect a finger gesture on the touch screen display on the switch application icon; and
   respond to the finger gesture on the switch application icon by replacing display of the corresponding application user interface with the first user interface for the phone application while continuing to maintain the phone call.

14. The computer readable storage medium of claim 13, including instructions, which when executed by a portable multifunction device with a touch screen display, cause the device to: while displaying the menu of application icons in response to detecting activation of the menu icon or menu button and while continuing to maintain the phone call, display a switch application icon in the menu of application icons that is not displayed in the menu of application icons when there is no ongoing phone call, wherein in response to detecting activation of the switch application icon in the menu of application icons, the device replaces the menu of application icons with a display of the user interface of the phone application.

15. The computer readable storage medium of claim 13, including instructions, which when executed by a portable multifunction device with a touch screen display, cause the device to: in response to said detecting activation of the menu icon or menu button during the phone call, concurrently activate a speaker function for the phone call.

16. The computer readable storage medium of claim 13, the one or more programs further including instructions which cause the device to display the user interface for the phone application, during the phone call, so as to occupy all or substantially all of the touch screen display with the user interface for the phone application.

17. The computer readable storage medium of claim 13, wherein, when displaying the menu of application icons in response to detecting activation of the menu icon or menu button, including an icon for the phone application, the phone application icon is changed in appearance as compared to when there is no ongoing phone call.

18. The computer readable storage medium of claim 13, the one or more programs further including instructions which cause the device to display the corresponding application user interface so as to occupy all or substantially all of the touch screen display with the corresponding application user interface-while continuing to maintain the phone call.

19. A graphical user interface on a portable electronic device with a touch screen display, a memory, and one or more processors to execute one or more programs stored in the memory, the graphical user interface comprising:
   a first user interface for a phone application during a phone call;
   wherein:
      activation of a menu icon or menu button is detected during the phone call;
      in response to detecting activation of the menu icon or menu button, the first user interface for the phone application is replaced with a menu of application icons including an icon for the phone application and an icon for a non-telephone application;
      the phone call is maintained while displaying the menu of application icons on the touch screen display;
      a finger gesture is detected on an application icon in the menu of application icons other than the phone application icon;
      in response to detecting the finger gesture on the application icon other than the phone application icon, a corresponding application user interface is displayed on the touch screen display while continuing to maintain the phone call and the corresponding application user interface is modified to include a switch application icon that is not displayed in the corresponding application user interface when there is no ongoing phone call;
      a finger gesture is detected on the touch screen display on the switch application icon; and
      in response to detecting the finger gesture on the switch application icon, display of the corresponding application user interface is replaced by the first user interface for the phone application while continuing to maintain the phone call.

20. The graphical user interface of claim 19, including a switch application icon in the menu of application icons, displayed while the menu of application icons is displayed in response to detecting activation of the menu icon or menu button and while the portable electronic device continues to maintain the phone call, wherein the switch application icon is not displayed when there is no ongoing phone call, wherein in response to detection of activation of the switch application icon in the menu of application icons, the menu of application icons is replaced with a display of the phone application user interface.

21. The graphical user interface of claim 19, wherein, in response to said detection of activation of the menu icon or menu button during the phone call, a speaker function for the phone call is concurrently activated.

* * * * *